(12) United States Patent
Ikeda et al.

(10) Patent No.: US 12,197,801 B2
(45) Date of Patent: Jan. 14, 2025

(54) TERMINAL APPARATUS, DISPLAY CONTROL METHOD, AND PROGRAM FOR DISPLAYING DIRECTION TOWARD TARGET POSITION

(71) Applicant: SEIKO EPSON CORPORATION, Tokyo (JP)

(72) Inventors: Iwane Ikeda, Nagano (JP); Hiroyuki Kuramoto, Shiojiri (JP); Yui Imamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/335,495

(22) Filed: Jun. 15, 2023

(65) Prior Publication Data

US 2023/0409262 A1     Dec. 21, 2023

(30) Foreign Application Priority Data

Jun. 17, 2022   (JP) .................. 2022-097758

(51) Int. Cl.
    *G06F 3/12*        (2006.01)
(52) U.S. Cl.
    CPC .......... *G06F 3/1293* (2013.01); *G06F 3/1203* (2013.01); *G06F 3/121* (2013.01); *G06F 3/1234* (2013.01); *G06F 3/1236* (2013.01); *G06F 3/1286* (2013.01); *G06F 3/1292* (2013.01)
(58) Field of Classification Search
    CPC ...... G06F 3/1293; G06F 3/1203; G06F 3/121; G06F 3/1234; G06F 3/1236; G06F 3/1286; G06F 3/1292
    See application file for complete search history.

(56) References Cited

U.S. PATENT DOCUMENTS

| 2013/0189929 | A1* | 7/2013 | Takahashi | G01S 3/38 342/372 |
| 2013/0208312 | A1* | 8/2013 | Morita | G06F 3/1292 358/1.15 |
| 2014/0211252 | A1* | 7/2014 | Tsujimoto | G06F 3/1236 358/1.15 |
| 2015/0070725 | A1* | 3/2015 | Monden | G06F 3/1204 358/1.15 |

(Continued)

FOREIGN PATENT DOCUMENTS

JP     2021-029012 A    2/2021

*Primary Examiner* — Juan M Guillermety
(74) *Attorney, Agent, or Firm* — WORKMAN NYDEGGER

(57) ABSTRACT

A distance information acquisition section acquires distance information representing the distance between a terminal apparatus and an electronic instrument through short-range wireless communication with the electronic instrument. A direction information acquisition section acquires first direction information representing the direction toward the electronic instrument with respect to the terminal apparatus through the short-range wireless communication with the electronic instrument. A correction section carries out the process of correcting the first direction information based on the distance information in such a way that the first direction information indicates the direction toward a target position on the electronic instrument. A display control section causes a display section to display the direction toward the target position based on the corrected first direction information.

10 Claims, 15 Drawing Sheets

(56) References Cited

U.S. PATENT DOCUMENTS

2021/0044706 A1    2/2021  Ito
2021/0132876 A1*   5/2021  Komatsu ............... G06F 3/1226
2022/0004345 A1*   1/2022  Tran ..................... G06F 3/1232
2022/0381869 A1*  12/2022  Sun ...................... G01S 5/0263

* cited by examiner

TERMINAL APPARATUS, DISPLAY CONTROL METHOD, AND PROGRAM FOR DISPLAYING DIRECTION TOWARD TARGET POSITION

The present application is based on, and claims priority from JP Application Serial Number 2022-097758, filed Jun. 17, 2022, the disclosure of which is hereby incorporated by reference herein in its entirety.

BACKGROUND

1. Technical Field

The present disclosure relates to a terminal apparatus, a display control method, and a program.

2. Related Art

JP-A-2021-29012 discloses a terminal that performs Bluetooth (registered trademark) communication with an image processing apparatus. The terminal described in JP-A-2021-29012 receives a Bluetooth packet transmitted from the image processing apparatus, senses the direction toward the position where the image processing apparatus is located based on the received packet, and displays the sensed direction toward the position where the image processing apparatus is located on a display section.

The technology described in JP-A-2021-29012 senses the direction toward an antenna of the image processing apparatus and displays the direction toward the antenna of the image processing apparatus on the display section. Therefore, when a user holding the terminal approaches the image processing apparatus in such a way that the distance therebetween is smaller than or equal to a predetermined distance, the direction displayed on the display section may deviate from the direction toward a desired position (direction toward center of image processing apparatus, position of operation panel of image processing apparatus, or any other position on image processing apparatus). The technology described in JP-A-2021-29012 may therefore cause loss of convenience of the user.

SUMMARY

A terminal apparatus according to an aspect of the present disclosure includes a distance information acquisition section that acquires distance information representing a distance between the terminal apparatus and an electronic instrument through short-range wireless communication with the electronic instrument, a direction information acquisition section that acquires first direction information representing a direction toward the electronic instrument with respect to the terminal apparatus through the short-range wireless communication with the electronic instrument, a correction section that carries out the process of correcting the first direction information based on the distance information in such a way that the first direction information indicates a direction toward a target position on the electronic instrument, and a display control section that causes a display section to display the direction toward the target position based on the corrected first direction information.

A display control method according to another aspect of the present disclosure includes acquiring distance information representing a distance between a terminal apparatus and an electronic instrument through short-range wireless communication with the electronic instrument, acquiring first direction information representing a direction toward the electronic instrument with respect to the terminal apparatus through the short-range wireless communication with the electronic instrument, carrying out the process of correcting the first direction information based on the distance information in such a way that the first direction information indicates a direction toward a target position on the electronic instrument, and causing a display section to display the direction toward the target position based on the corrected first direction information.

A program according to another aspect of the present disclosure causes a computer to acquire distance information representing a distance between a terminal apparatus and an electronic instrument through short-range wireless communication with the electronic instrument, acquire first direction information representing a direction toward the electronic instrument with respect to the terminal apparatus through the short-range wireless communication with the electronic instrument, carry out the process of correcting the first direction information based on the distance information in such a way that the first direction information indicates a direction toward a target position on the electronic instrument, and cause a display section to display the direction toward the target position based on the corrected first direction information.

DESCRIPTION OF EXEMPLARY EMBODIMENTS

First Embodiment

Figure 1:
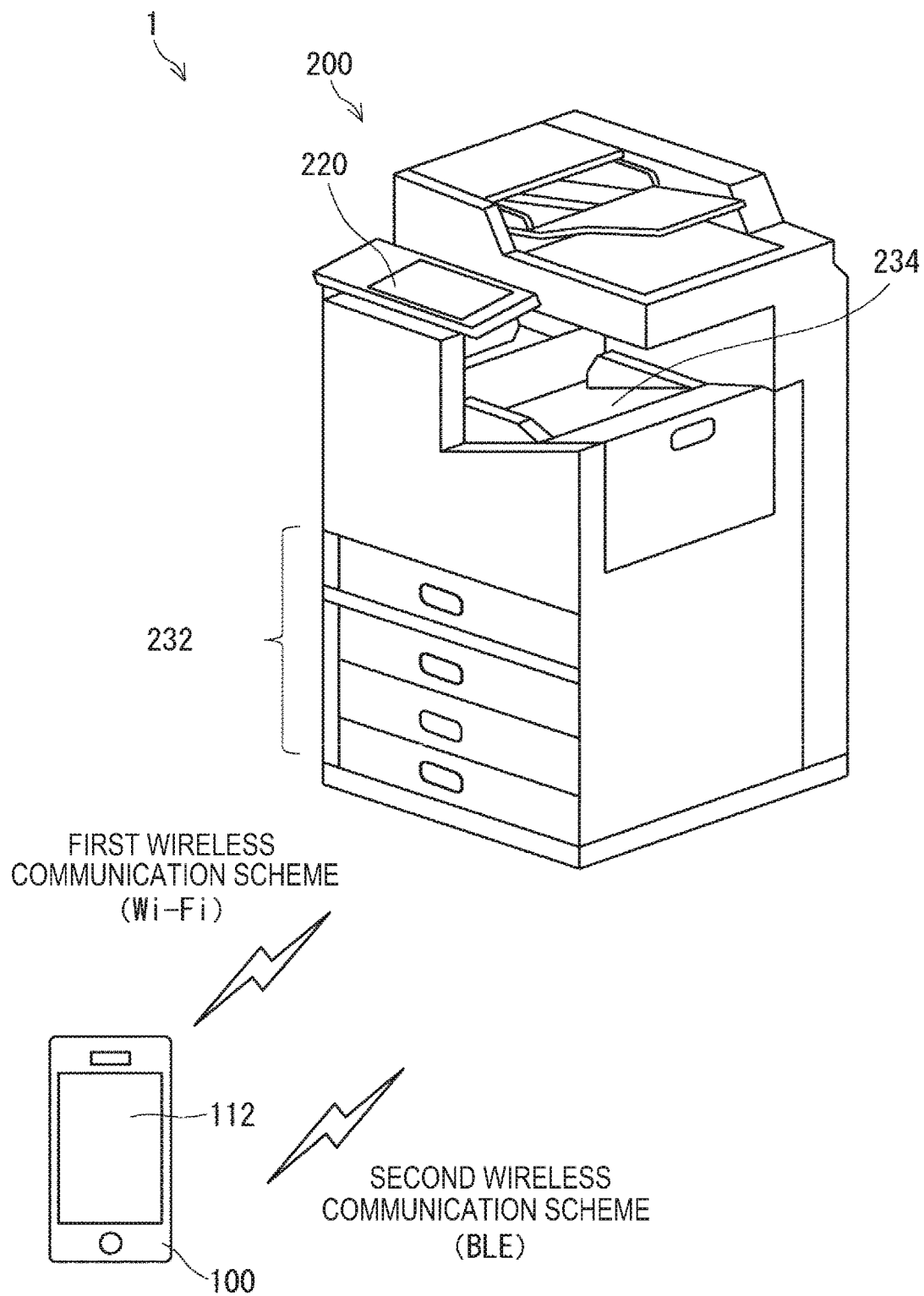
FIG. 1 shows a communication system according to a first embodiment.

An embodiment will be described below with reference to the drawings. For clarity of the description, omission and simplification are made as appropriate in the following description and drawings. In the drawings, the same element has the same reference character, and no duplicate description of the same element is made when necessary.

Figure 2:
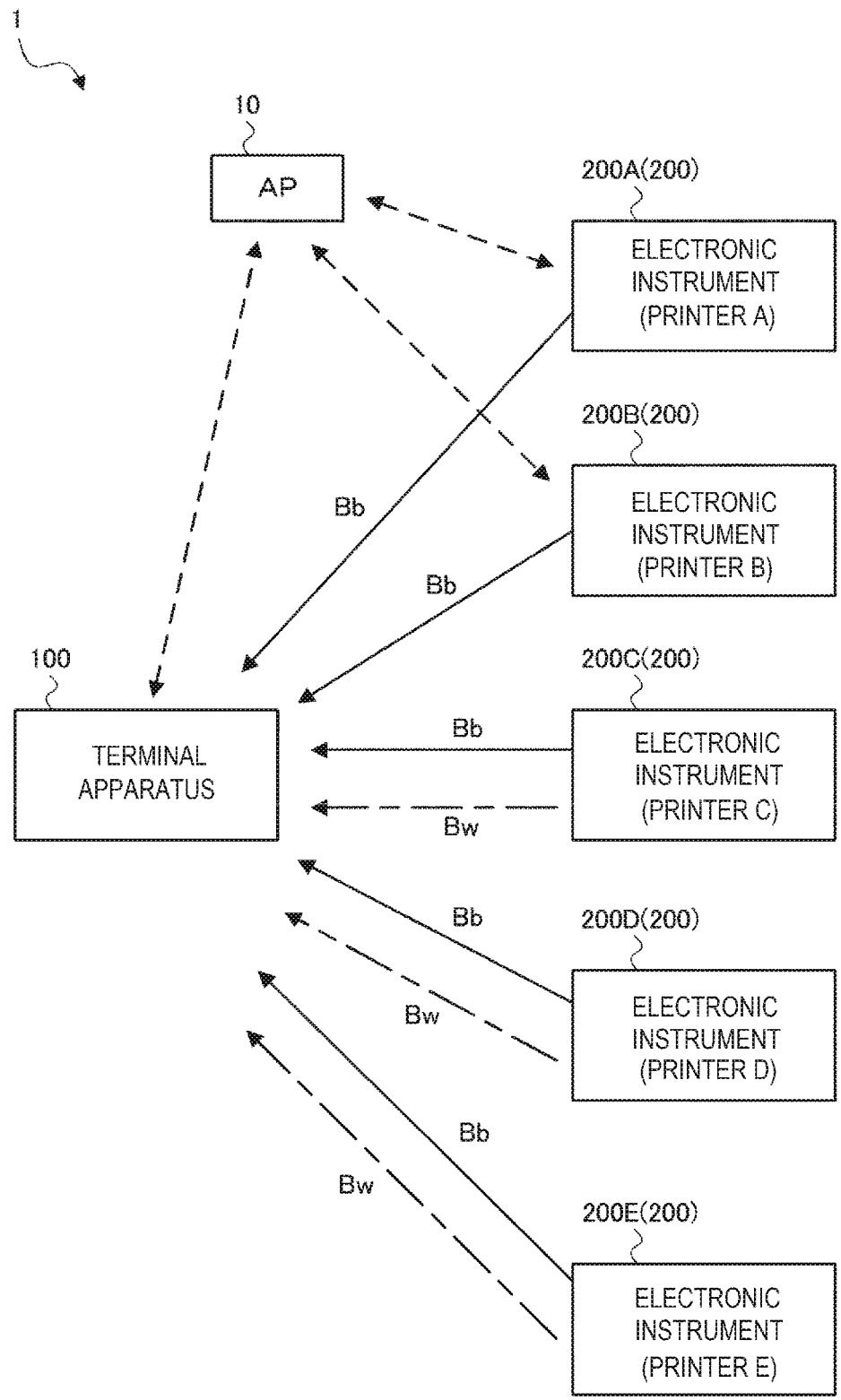
FIG. 2 shows the communication system according to the first embodiment.

FIGS. 1 and 2 show a communication system 1 according to a first embodiment. FIG. 1 diagrammatically show the communication system 1 according to the first embodiment. The communication system 1 includes a terminal apparatus 100 and an electronic instrument 200.

The terminal apparatus 100 is a portable terminal apparatus such as a smartphone or a tablet terminal. The terminal apparatus 100 may instead be a computer apparatus such as a personal computer (PC). The terminal apparatus 100 includes at least a display section 112. Other components of the terminal apparatus 100 will be described later.

The electronic instrument 200 is, for example, a printer. The electronic instrument 200 may instead, for example, be a multifunction peripheral instrument (MFP), a projector apparatus, or a scanner. A multifunction peripheral instrument having a printing function is also an example of the printer. The first embodiment will be described with reference to a case where the electronic instrument 200 is, for example, a printer such as a multifunction peripheral instrument.

The electronic instrument 200, which is a printer, includes at least an operation panel 220, a paper feed tray 232, and a paper discharge tray 234. The operation panel 220 is, for example, a touch panel into which a display device and an input device are integrated with each other. The paper feed tray 232 stores sheets of paper, which are each a print medium, for example, on a sheet size basis. Sheets of paper on which images have been formed are discharged into the paper discharge tray 234. Other components of the electronic instrument 200 will be described later.

The terminal apparatus 100 and the electronic instrument 200 communicate with each other over wireless communication using a first wireless communication scheme and wireless communication using a second wireless communication scheme. The first wireless communication scheme is a standard that provides a faster communication speed and a longer communicable distance than the second wireless communication scheme. The first wireless communication scheme is a wireless LAN (local area network) in a narrow sense, and more specifically Wi-Fi (registered trademark). The case where the first wireless communication scheme is Wi-Fi will be described below, but the first wireless communication scheme may be replaced with any other communication scheme.

The second wireless communication scheme is a standard that provides a slower communication speed and a shorter communicable distance than the first wireless communication scheme. The second wireless communication scheme is therefore a standard for achieving short-range wireless communication. The second wireless communication scheme is a standard that allows beacon signal transmission. The second wireless communication scheme is Bluetooth in a narrow sense, and more specifically BLE (Bluetooth Low Energy). The case where the second wireless communication scheme is BLE will be described below, but the second wireless communication scheme may be replaced with any other communication scheme. The BLE beacon signal corresponds to an advertisement packet. The first wireless communication scheme may also allow beacon signal transmission. When the first wireless communication scheme is Wi-Fi, the electronic instrument 200 may transmit a beacon signal that informs peripheral instruments of an SSID (service set identifier) of the electronic instrument 200.

FIG. 2 shows an example of the communication system 1 including a plurality of electronic instruments 200. The communication system 1 shown by way of example in FIG. 2 includes five electronic instruments 200A to 200E, the terminal apparatus 100, and an access point 10. The access point 10 is, for example, a wireless LAN access point. In the following description, the electronic instruments 200A to 200E may be referred to as printers A to E, respectively.

The electronic instruments 200 each transmit (broadcast) a BLE beacon Bb corresponding to the second wireless communication scheme. The BLE beacon Bb is a beacon signal that complies with the BLE standard. The terminal apparatus 100 receives a BLE beacon Bb and can search for the corresponding electronic instrument 200. Furthermore, the terminal apparatus 100 receives a BLE beacon Bb and can acquire distance information representing the distance from the terminal apparatus 100 to the corresponding electronic instrument 200. When the terminal apparatus 100 and the electronic instruments 200 support the Bluetooth 5.1 standard and later, the terminal apparatus 100 receives a BLE beacon Bb and can acquire first direction information representing the direction toward the corresponding electronic instrument 200 with respect to the terminal apparatus 100. The actions described above will be described later in detail.

The electronic instruments 200A and 200B can be connected to the terminal apparatus 100 via the access point 10. When the two electronic instruments 200 operate in an infrastructure mode and is connected to the access point 10, the wireless communication between the terminal apparatus 100 and the electronic instruments 200 is performed by the terminal apparatus 100 that establishes wireless connection to the access point 10. The connection described above is referred to as infrastructure connection.

On the other hand, the electronic instruments 200C to 200E can be directly connected to the terminal apparatus 100 via no access point 10. In this process, the three electronic instruments 200 each activate an internal access point, and the terminal apparatus 100 connects to the internal access point, so that the communication between the terminal apparatus 100 and the three electronic instruments 200 is directly performed. The connection described above is referred to as direct connection. The direct connection between the terminal apparatus 100 and any of the three electronic instruments 200 may be established over communication compliant with the WFD (Wi-Fi direct) standard, or by using a Wi-Fi ad hoc mode.

The electronic instruments 200C to 200E each transmit (broadcast) a Wi-Fi beacon Bw containing an SSID. The Wi-Fi beacon Bw is a beacon signal that complies with the Wi-Fi standard. When the terminal apparatus 100 receives a Wi-Fi beacon Bw, the SSID contained in the Wi-Fi beacon Bw is displayed. At this point of time, the SSID and a password for connection are displayed on the operation panel 220 of the corresponding one of the electronic instruments 200C to 200E. A user of the terminal apparatus 100 sets the SSID and the password, which are displayed on the operation panel 220, in the terminal apparatus 100 operated by the user, so that the terminal apparatus 100 is directly connected to the corresponding one of the electronic instruments 200C to 200E.

Figure 3:
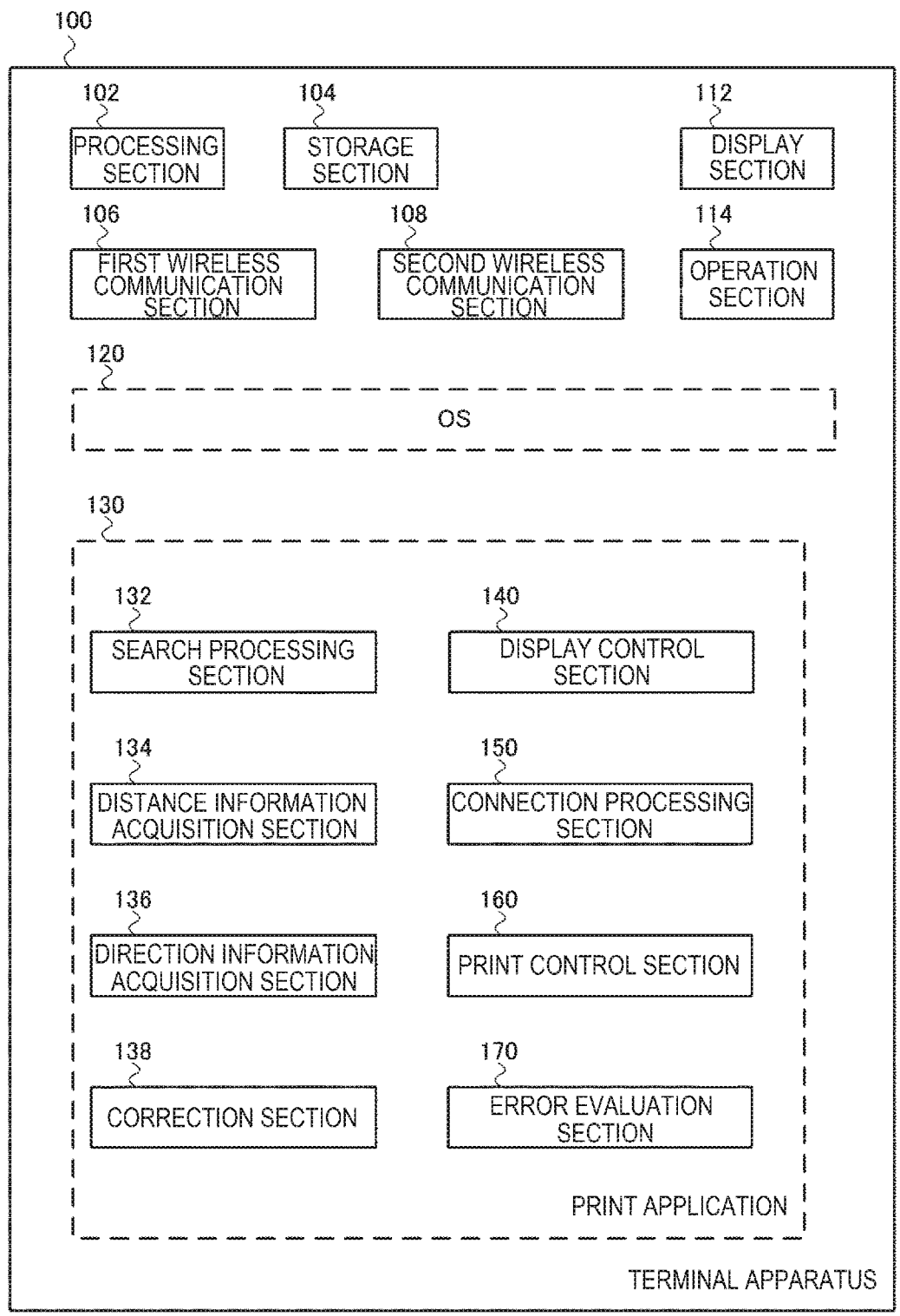
FIG. 3 shows the configuration of a terminal apparatus according to the first embodiment.

FIG. 3 shows the configuration of the terminal apparatus 100 according to the first embodiment. The terminal apparatus 100 includes as a primary hardware configuration a processing section 102, a storage section 104, a first wireless communication section 106, a second wireless communication section 108, a display section 112, and an operation section 114. The processing section 102, the storage section 104, the first wireless communication section 106, the second wireless communication section 108, the display section 112, and the operation section 114 may be interconnected to each other, for example, via a data bus.

The processing section 102 is, for example, a CPU (central processing unit) or any other processor. The processing section 102 may include a plurality of processors. The processing section 102 functions as an arithmetic operation apparatus that carries out a control process, an arithmetic operation process, and other processes. The processing section 102 controls the storage section 104, the first wireless communication section 106, the second wireless communication section 108, the display section 112, and the operation section 114.

The storage section 104 is a storage device, for example, a memory or a hard disk drive. The storage section 104 is, for example, a ROM (read only memory) or a RAM (random access memory). The storage section 104 has the function of storing a control program, an arithmetic operation program, and other programs executed by the processing section 102. The storage section 104 further has the function of temporarily storing processed data and other data. The storage section 104 can include a database.

The first wireless communication section 106 is a wireless communication device that performs wireless communication compliant with the first wireless communication scheme. The first wireless communication section 106, for example, performs wireless communication compliant with the Wi-Fi standard. The second wireless communication section 108 is a wireless communication device that performs wireless communication compliant with the second wireless communication scheme. The second wireless communication section 108, for example, performs wireless communication compliant with the BLE standard.

The display section 112 and the operation section 114 form a user interface. The display section 112 is formed, for example, of a monitor that displays a variety of pieces of information to the user. The operation section 114 is formed, for example, of buttons that accept the user's input operation. The display section 112 and the operation section 114 may be integrated with each other into a touch panel or any other component.

The terminal apparatus 100 has as a software configuration an OS 120 (operating system), which is basic software, and a print application 130. The print application 130 is application software that operates by using the functions of the OS 120. The print application 130 has as components a search processing section 132, a distance information acquisition section 134, a direction information acquisition section 136, a correction section 138, a display control section 140, a connection processing section 150, a print control section 160, and an error evaluation section 170.

The components described above can each be achieved, for example, by execution of a program under the control of the processing section 102. More specifically, each of the components of the print application 130 can be achieved by the processing section 102 through execution of a program stored in the storage section 104. Instead, necessary programs may be recorded on any nonvolatile recording medium and installed as required to achieve each of the components.

Each of the components is not necessarily achieved by software formed of a program and may instead be achieved, for example, by a combination of any of hardware, firmware, and software. Each of the components may still instead be achieved by using a user-programmable integrated circuit, such as a field-programmable gate array (FPGA) or a micro-computer. In this case, the integrated circuit may be used to achieve a program formed of the components described above.

The search processing section 132 carries out the process of searching for an electronic instrument 200 by using the first and second wireless communication schemes. The process will be described later in detail. The distance information acquisition section 134 acquires the distance information representing the distance between the terminal apparatus 100 and each of the electronic instruments 200 through the short-range wireless communication with the electronic instrument 200. The acquisition will be described later in detail. The direction information acquisition section 136 acquires the first direction information representing the direction toward each of the electronic instruments 200 with respect to the terminal apparatus 100 through the short-range wireless communication with the electronic instrument. The acquisition will be described later in detail.

The correction section 138 carries out the process of correcting the first direction information. The correction section 138 carries out the process of correcting the first direction information based on the distance information in such a way that the first direction information indicates the direction toward a target position on the electronic instrument 200. The process will be described later in detail. The correction section 138 may carry out the correction process when the distance to the electronic instrument 200 is smaller than a threshold specified in advance.

The display control section 140 controls the display on the display section 112. Specifically, the display control section 140 performs the control in such a way that the display section 112 displays information on an electronic instrument 200 found by the search process carried out by the search processing section 132. The display control section 140 causes the display section 112 to display the direction toward the target position with respect to the terminal apparatus 100 based on the corrected first direction information. The control will be described later in detail.

The correction section 138 may carry out the correction process based on information that associates the distance to the electronic instrument 200, the angle corresponding to the direction toward the terminal apparatus 100 with respect to the electronic instrument 200, and the amount by which the first direction information has been corrected with one another. The correction section 138 may calculate the amount by which the first direction information is corrected based on the distance to the electronic instrument 200, the angle corresponding to the direction toward the terminal apparatus 100 with respect to the electronic instrument 200, and the positional relationship between an antenna used for the short-range wireless communication and the target position. The actions described above will be described later in detail.

The target position described above can correspond to a position on the electronic instrument 200, the direction toward which should be displayed on the display section 112. The target position therefore corresponds to a desired direction that increases the degree of convenience for the user when the direction toward the target position is displayed on the display section 112. The target position described above may be the position corresponding to the operation panel 220 of the electronic instrument 200. The target position may be changed in accordance with conditions. When an error relating to the electronic instrument 200 occurs, the correction section 138 may carry out the process of correcting the first direction information in such a way that the corrected first direction information indicates the direction toward the target position relating to the error. In this case, the display control section 140 may cause the display section 112 to display the direction toward the target position relating to the error. Instead, when the terminal apparatus 100 transmits print data to an electronic instrument 200 having a printing function, the correction section 138 may carry out the process of correcting the first direction information in such a way that the corrected first direction information indicates the direction toward the target position corresponding to the paper discharge tray 234 of the electronic instrument 200 with respect to the terminal apparatus 100. In this case, the display control section 140 may cause the display section 112 to display the direction toward the target position corresponding to the paper discharge tray 234.

The connection processing section 150 carries out the process of connecting the terminal apparatus 100 to the electronic instrument 200 in a communicable manner. The process will be described later in detail. The print control section 160 controls the connected electronic instrument 200 (printer) to perform printing. The control will be described later in detail. When the print control section 160 accepts a print instruction issued by the user's operation, the print control section 160 performs the control in such a way that the print data is transmitted to the connected electronic instrument 200. The print instruction contains the print data. The "print data" is data representing an image to be printed on a sheet of paper. The error evaluation section 170 evaluates whether any error has occurred in the electronic instrument 200. The evaluation will be described later in detail.

Figure 4:
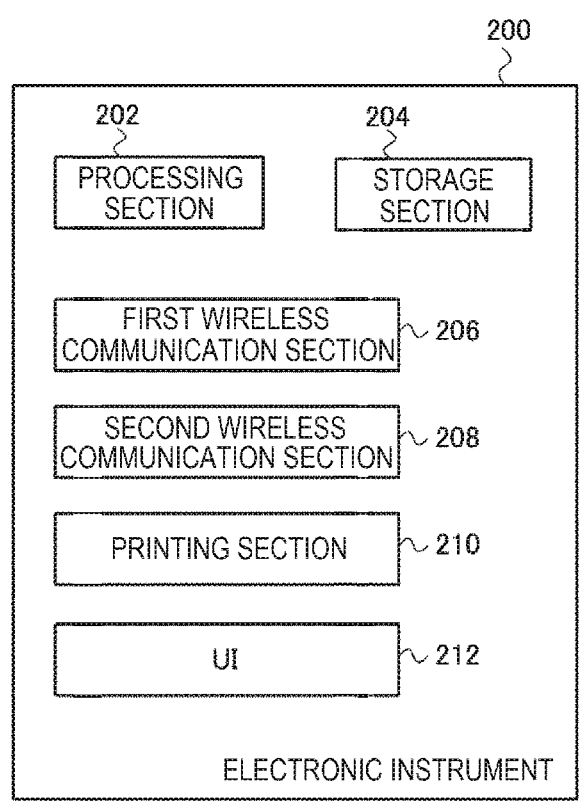
FIG. 4 shows the configuration of an electronic instrument according to the first embodiment.

FIG. 4 shows the configuration of each of the electronic instruments 200 according to the first embodiment. FIG. 4 shows the case where the electronic instrument 200 is a printer. The electronic instrument 200 includes a processing section 202, a storage section 204, a first wireless communication section 206, a second wireless communication section 208, a printing section 210, and a user interface (UI) 212. The processing section 202, the storage section 204, the first wireless communication section 206, the second wireless communication section 208, the printing section 210, and the user interface 212 may be interconnected to each other, for example, via a data bus.

The processing section 202 is a processor, for example, a CPU. The processing section 202 may include a plurality of processors. The processing section 202 functions as an arithmetic operation apparatus that carries out a control process, an arithmetic operation process, and other processes. The processing section 202 controls the storage section 204, the first wireless communication section 206, the second wireless communication section 208, the printing section 210, and the user interface 212.

The storage section 204 is a storage device, such as a memory or a hard disk drive. The storage section 204 is, for example, a ROM or a RAM. The storage section 204 has the function of storing a control program, an arithmetic operation program, and other programs executed by the processing section 202. The storage section 204 further has the function of temporarily storing processed data and other data. The storage section 204 can include a database.

The first wireless communication section 206 is a wireless communication device that performs wireless communication compliant with the first wireless communication scheme. The first wireless communication section 206, for example, performs wireless communication compliant with the Wi-Fi standard. The second wireless communication section 208 is a wireless communication device that performs wireless communication compliant with the second wireless communication scheme. The second wireless communication section 208, for example, performs wireless communication compliant with the BLE standard. The first wireless communication section 206 of each of the electronic instruments 200C to 200E may instead activate an internal access point in accordance with given connection settings. In this case, the first wireless communication section 206 accepts a connection request from the terminal apparatus 100. The connection settings are, for example, SSID and passphrase settings or communication frequency band settings. The communication frequency band settings correspond to channel settings.

The printing section 210 has a printing function of forming an image on a sheet of paper, that is, a print medium. The printing section 210 includes a print engine. The print engine is a mechanical configuration that prints an image on the print medium. The print engine may, for example, have a mechanism that performs toner-based printing in an electrophotographic scheme. The print engine may instead have, for example, a mechanism that performs inkjet printing. The print engine may have a transport mechanism that transports the print medium.

The user interface 212 includes an input apparatus such as buttons, a keyboard, a touch panel, or a mouse, and an output apparatus such as a monitor or a loudspeaker. The user interface 212 may be the input apparatus and the output apparatus integrated with each other into a unit. The user interface 212 accepts the user's operation of inputting data and outputs information to the user. The user interface 212 includes the operation panel 220 described above.

Figure 5:
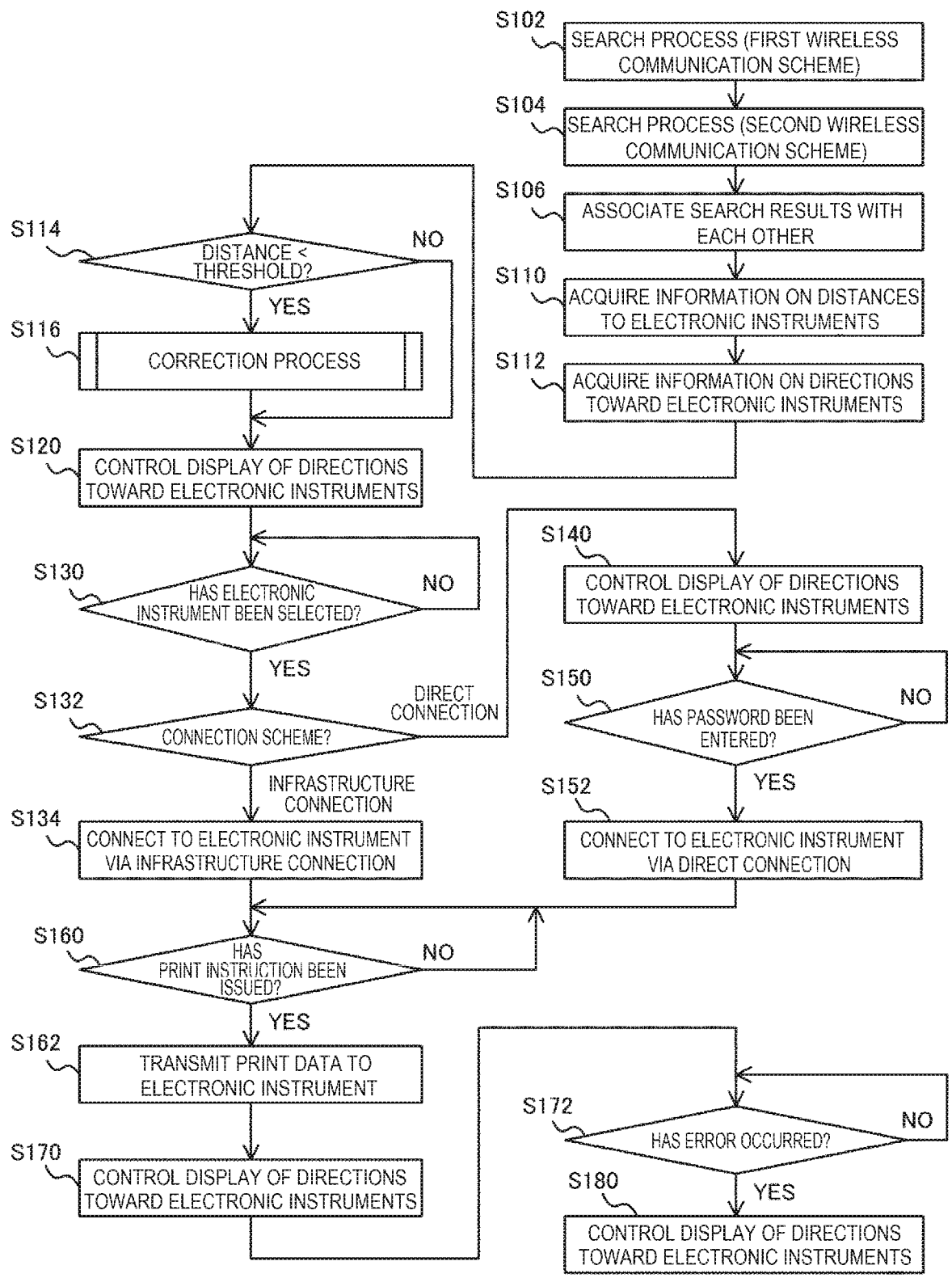
FIG. 5 is a flowchart showing processes carried out by the terminal apparatus according to the first embodiment.
Figure 6:
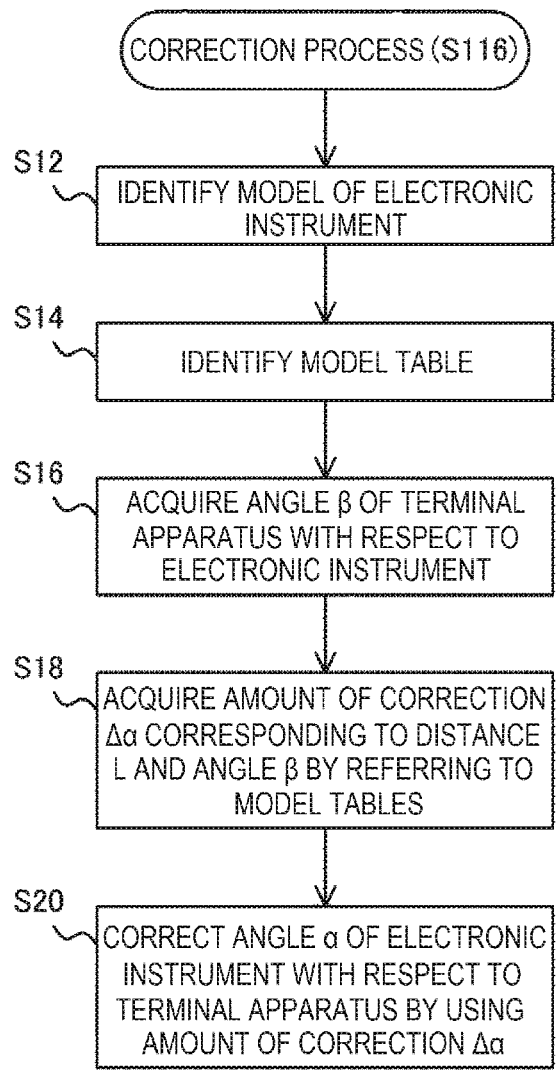
FIG. 6 is a flowchart showing processes carried out by the terminal apparatus according to the first embodiment.
Figure 7:
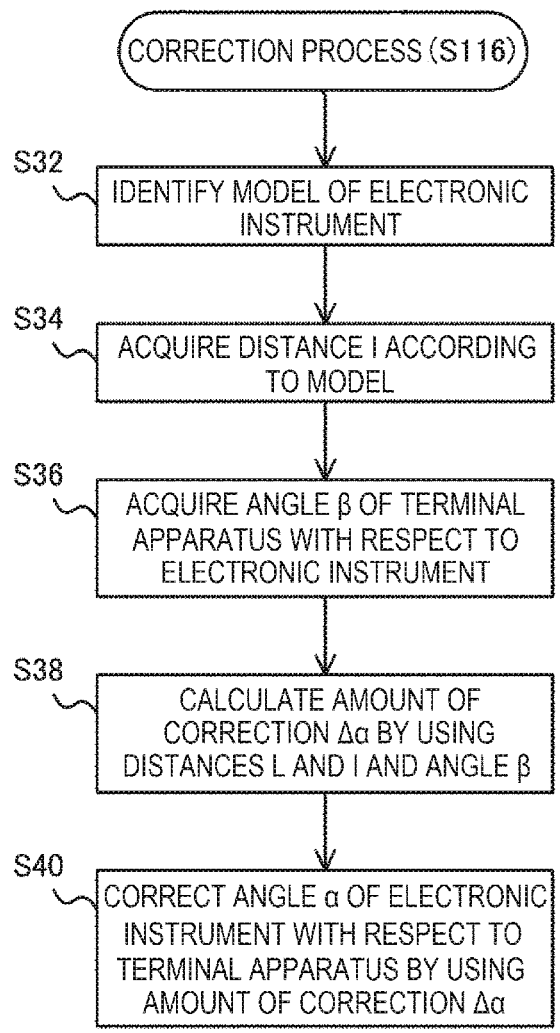
FIG. 7 is a flowchart showing processes carried out by the terminal apparatus according to the first embodiment.

FIGS. 5 to 7 are flowcharts showing processes carried out by the terminal apparatus 100 according to the first embodiment. Part of the flowchart shown in FIG. 5 and the flowcharts shown in FIGS. 6 and 7 correspond to a display control method executed by the terminal apparatus 100. The search processing section 132 performs the search process using the first wireless communication scheme (step S102). That is, the search processing section 132 searches for electronic instruments 200 that can be connected by using the first wireless communication scheme.

Specifically, the search processing section 132 searches for electronic instruments 200 capable of establishing the infrastructure connection as will be described below. In the example shown in FIG. 2, the search processing section 132 searches for the electronic instruments 200A and 200B as will be described below. That is, the search processing section 132 transmits a search request packet to the network established by the access point 10, to which the terminal apparatus 100 is connected. At this point of time, the electronic instruments 200A and 200B connected to the access point 10 each transmit a response packet in response to the search request packet. The search processing section 132 can search for electronic instruments 200 connected to the access point 10 based on the received response packets.

The search processing section 132 further searches for electronic instruments 200 capable of establishing the direct connection as will be described below. In the example shown in FIG. 2, the search processing section 132 searches for the electronic instruments 200C to 200E as will be described below. That is, the first wireless communication section 106 of the terminal apparatus 100 receives the Wi-Fi beacon Bw transmitted by each of the three electronic instruments 200. The search processing section 132 can search for electronic instruments 200 capable of establishing the direct connection based on the received Wi-Fi beacons Bw.

The search processing section 132 acquires a search result indicating electronic instruments 200 found by the search. In this process, the search processing section 132 may acquire identification information and address information of the found electronic instruments 200 that are contained in the response packet or the Wi-Fi beacon Bw. The identification information is, for example, but not limited to, the serial numbers of the electronic instruments 200. The identification information of an electronic instrument 200 that establishes the direct connection may be an SSID. The address information is an address unique to an electronic instrument 200. The address information is, for example, but not limited to, the media access control (MAC) address.

The search processing section 132 carries out the search process using the second wireless communication scheme (step S104). Specifically, the second wireless communication section 108 of the terminal apparatus 100 receives the BLE beacon Bb transmitted by each of the electronic instruments 200. The search processing section 132 can search for electronic instruments 200 based on the received BLE beacons Bb. The search processing section 132 acquires search results indicating electronic instruments 200 found by the search. In this process, the search processing section 132 may acquire identification information and address information of the electronic instruments 200 that are contained in the BLE beacons Bb.

The search processing section 132 carries out the process of associating the search results with each other (step S106). Specifically, the search processing section 132 associates the result of the search using the first wireless communication scheme in S102 with the result of the search using the second wireless communication scheme in S104 based on the address information of the electronic instruments 200 found by the search. At this point of time, the display control section 140 may cause the display section 112 to display the associated search results. That is, the display control section 140 may cause the display section 112 to display information on the electronic instruments 200 found by the search. Furthermore, the display control section 140 may cause the display section 112 to display a device list that is a list of the information on electronic instruments 200 found by the search.

More specifically, the search processing section 132 compares the address information contained in the results of the search using the first wireless communication scheme with the address information contained in the results of the search using the second wireless communication scheme. As a result of the comparison, the search processing section 132 associates the address information search results that coincide with each other as the result of the search for the same electronic instrument 200. The result of the search using the first wireless communication scheme indicates electronic instruments 200 connectable by using the first wireless communication scheme, such as Wi-Fi. On the other hand, the BLE beacon Bb used in the search using the second wireless communication scheme can contain additional information that is not acquired by the response packet and the Wi-Fi beacon Bw used in the search process using the first wireless communication scheme. Associating the search results with each other can therefore indicate the additional information on the electronic instruments 200 connectable by using the first wireless communication scheme, such as Wi-Fi.

The additional information is, for example, status information representing the state of an electronic instrument 200. The status information can indicate, for example, whether the electronic instrument 200 is in an operating, idle, or error state. The operating state is a state in which the electronic instrument 200 is executing a job, such as printing, by using the functions thereof. The idle state is a state in which the electronic instrument 200 is not executing any job and is waiting for job submission. The error state is a state in which some error has occurred in the electronic instrument 200 and the electronic instrument 200 is unable to execute a job. For example, when the electronic instrument 200 is a printer, the error state is a state in which the printer experiences lack of ink/toner, lack of sheets of paper or any other print medium, a jammed print medium, or component failure. The operating state is a state that does not allow a new job to be immediately executed. The idle state is a state that allows a new job to be immediately executed. The error state is a state that requires the user's action to execute a job.

The distance information acquisition section 134 acquires information on the distances to the found electronic instruments 200 through the short-range wireless communication such as BLE or Bluetooth (step S110). Specifically, the distance information acquisition section 134 acquires radio wave intensity information representing the radio wave intensity of each of the received BLE beacons Bb. The radio wave strength information can correspond to a received radio wave intensity or a received signal intensity. The distance information acquisition section 134 uses the radio wave intensity information to estimate the distance between the terminal apparatus 100 and the electronic instrument 200.

That is, the greater the radio wave intensity of the BLE beacon Bb, the smaller the distance between the electronic instrument 200 having transmitted the BLE beacon Bb and the terminal apparatus 100. Conversely, the smaller the radio wave intensity of the BLE beacon Bb, the greater the distance between the electronic instrument 200 having transmitted the BLE beacon Bb and the terminal apparatus 100. For example, in the case of iBeacon (registered trademark), which is one of the BLE standards, the location from which the beacon signal is issued can be selected from the following three locations: "Immediate"; "Near"; and "Far". For example, "Immediate" corresponds to a distance of about a few centimeters, "Near" corresponds to about a few meters, and "Far" corresponds to about 10 meters. The distance information acquisition section 134 thus acquires the distance information representing the distance between the terminal apparatus 100 and any of the electronic instruments 200.

The distance information acquiring section 134 may instead calculate the distance between the electronic instrument 200 having transmitted the BLE beacon Bb and the terminal apparatus 100 based on the radio wave intensity of the BLE beacon Bb. In general, it is known that the radio wave intensity weakens in inversely proportional to the square of the distance. Therefore, when the radio wave intensity at a reference distance is known, the distance between the terminal apparatus 100 and the electronic instrument 200 can be calculated based on the radio wave intensity of the actually received BLE beacon Bb. In this case, it is assumed that the BLE beacon Bb contains reference radio wave intensity information. The distance information acquisition section 134 then calculates the distance between the terminal apparatus 100 and the electronic instrument 200 based on the reference radio wave intensity information and the radio wave intensity information. The distance information acquisition section 134 thus acquires the distance information representing the distance between the terminal apparatus 100 and the electronic instrument 200.

The direction information acquisition section 136 acquires information on the direction toward each of the electronic instruments 200 found through the short-range wireless communication, such as BLE or Bluetooth (step S112). Specifically, the direction information acquisition section 136 acquires the first direction information representing the direction toward the electronic instrument 200 with respect to the terminal apparatus 100 by using a direction sensing function specified in the Bluetooth 5.1 standard and later. More specifically, the direction information acquisition section 136 calculates the angle of reception, that is, the angle of arrival (AoA) of the radio wave, at the terminal apparatus 100, of the BLE beacon Bb transmitted from the electronic instrument 200. The angle of arrival AoA can be calculated in accordance with the AoA scheme described in JP-A-2021-29012. That is, the terminal apparatus 100 includes a plurality of antennas. The terminal apparatus 100 receives radio waves, that is, the BLE beacons Bb, via the plurality of antennas. The direction information acquisition section 136 of the terminal apparatus 100 calculates the angle of arrival AoA, which is an angle with respect to the direction in which the plurality of antennas are arranged, based on the distance between the plurality of antennas and the difference in phase between the radio waves received by the plurality of antennas.

The correction section 138 evaluates whether the distance between the terminal apparatus 100 and an electronic instrument 200 is smaller than the threshold specified in advance (step S114). Specifically, the correction section 138 evaluates whether the distance indicated by the distance information acquired in the process in S110 is smaller than the threshold. When the distance to the electronic instrument 200 is not smaller than the threshold (NO in S114), the process in S116, which will be described later, is omitted. On the other hand, when the distance to the electronic instrument 200 is smaller than the threshold (YES in S114), the correction section 138 carries out the process of correcting the first direction information (step S116). That is, the correction section 138 carries out the process of correcting the first direction information in such a way that the first direction information indicates the direction toward the target position on the electronic instrument 200 with respect to the terminal apparatus 100. The content of the process in S116 will be described later. The target position on the electronic instrument 200 is, for example, the position corresponding to the operation panel 220. The target position can, however, be changed in accordance with conditions, as described above.

The processes in S110 to S116 may be carried out at later timings as appropriate. For example, the electronic instruments 200 may each transmit the BLE beacon Bb whenever a predetermined period elapses. In this case, the terminal apparatus 100 may carry out the processes in S110 to S116 whenever the terminal apparatus 100 receives a BLE beacon Bb. Instead, the terminal apparatus 100 may carry out the processes in S110 to S116 before carrying out the processes in S120, S140, S170, and S180, which will be described later. The processes in S172 and S180, which will be described later, can each be carried out at any timing.

Similarly, the processes in S102 to S106 may be carried out at later timings as appropriate. For example, the electronic instruments 200 may each transmit the Wi-Fi beacon Bw whenever a predetermined period elapses. In this case, the terminal apparatus 100 may carry out the process in S102 whenever the terminal apparatus 100 receives a Wi-Fi beacon Bw. When the terminal apparatus 100 transmits the search request packet whenever a predetermined period elapses, the terminal apparatus 100 may carry out the process in S102 whenever the terminal apparatus 100 receives a response packet. The terminal apparatus 100 may carry out the process in S104 whenever the terminal apparatus 100 receives a BLE beacon Bb. The terminal apparatus 100 may then carry out the process in S106 whenever the processes in S102 and S104 are carried out as described above.

The display control section 140 controls the display of the directions toward the found electronic instruments 200 (step S120). Specifically, the display control section 140 performs the control in such a way that the display section 112 displays a direction display indicating the directions indicated by the first direction information. When the correction process in S116 is not carried out, the first direction information can indicate the directions of antennas of the electronic instruments 200 (wireless substrate 240, which will be discussed later). Therefore, in this case, the display control section 140 causes the display section 112 to display the direction display indicating the directions of the antennas of the electronic instruments 200.

On the other hand, when the process in S116 is carried out, the display control section 140 causes the display section 112 to display the direction toward the target position on each of the electronic instruments 200 with respect to the terminal apparatus 100 based on the corrected first direction information. In the process in S116 carried out before S120, the target position is the position corresponding to the operation panel 220 of the electronic instrument 200. That is, the correction section 138 carries out the correction process by using the target position as the position of the operation panel 220. In other words, the correction section 138 carries out the process of correcting the first direction information in such a way that the corrected first direction information indicates the direction toward the operation panel 220 with respect to the terminal apparatus 100. The display control section 140 then causes the display section 112 to display the direction toward the operation panel 220 of each of the electronic instruments 200 with respect to the terminal apparatus 100. The display control section 140 may cause the display section 112 to display some message.

The connection processing section 150 evaluates whether an electronic instrument 200 that should execute a job, such as printing, has been selected (step S130). For example, the connection processing section 150 evaluates whether an electronic instrument 200 has been selected by the user's operation of selecting one electronic instrument 200 from the device list of the electronic instruments 200 displayed on the display section 112 under the control of the display control section 140. For example, when the user taps one of the electronic instruments in the device list of the electronic instruments 200 displayed on the display section 112, which is a touch panel, the tapped electronic instrument 200 is selected. When the electronic instrument 200 is not selected (NO in S130), the connection processing section 150 repeats the process in S130.

On the other hand, when an electronic instrument 200 is selected (YES in S130), the connection processing section 150 evaluates whether the connection scheme for the selected electronic instrument 200 is the infrastructure connection or the direct connection (step S132). The evaluation may be performed in accordance with the result of the process in S102, whether the selected electronic instrument 200 has been found by a response packet in response to the search request packet or by the Wi-Fi beacon Bw. In this case, when the selected electronic instrument 200 has been found by the response packet, the connection processing section 150 determines that the connection scheme for the selected electronic instrument 200 is the infrastructure connection. On the other hand, when the selected electronic instrument 200 has been found by the Wi-Fi beacon Bw, the connection processing section 150 determines that the connection scheme for the selected electronic instrument 200 is the direct connection.

Each BLE beacon Bb may include information representing the connection scheme for an electronic instrument 200 having transmitted the BLE beacon Bb. In this case, when the selected electronic instrument 200 has been found by a BLE beacon Bb in the process in S104, the connection processing section 150 may use information representing the connection scheme contained in the BLE beacon Bb to determine the connection scheme. The connection processing section 150 may instead determine that the connection scheme for the selected electronic instrument 200 is the direct connection when the information on the selected electronic instrument 200 contains a unique SSID. On the other hand, the connection processing section 150 may determine that the connection scheme for the selected electronic instrument 200 is the infrastructure connection when the information on the selected electronic instrument 200 contains an SSID relating to the access point 10.

When an electronic instrument 200 is selected, the display control section 140 may display the selected electronic instrument 200 in the device list in such a way that the selected electronic instrument 200 is distinguishable from the electronic instruments 200 that have not been selected. For example, the display control section 140 may display the selected electronic instrument 200 in the device list in such a way that the selected electronic instrument 200 stands out from the electronic instruments 200 that have not been selected.

When the connection scheme for the selected electronic instrument 200 is the infrastructure connection ("infrastructure connection" in S132), the connection processing section 150 carries out the process of connecting the terminal apparatus 100 to the electronic instrument 200 via the infrastructure connection (step S134). In this case, the connection processing section 150 carries out the process of connecting the terminal apparatus 100 to the electronic instrument 200 via the access point 10 as described above. In this process, the connection processing section 150 may control the first wireless communication section 106 in such a way that the terminal apparatus 100 is connected to the electronic instrument 200 by using the first wireless communication scheme.

On the other hand, when the connection scheme for the selected electronic instrument 200 is the direct connection ("direct connection" in S132), the display control section 140 controls the display of the direction toward the selected electronic instrument 200 (step S140). The process in S140 may be substantially the same as the process in S120 described above. The message displayed on the display section 112 in the process in S140 may, however, differ from that in the process in S120. That is, in the process in S140, the display section 112 may display a message that prompts the user to enter the password displayed on the operation panel 220 of the electronic instrument 200 to the terminal apparatus 100. The processes in S110 to S116 may be carried out before the process in S140, as described above. The display control section 140 therefore controls the display section 112 in such a way that the display section 112 displays the direction display indicating the direction indicated by the first direction information. When the process in S116 is carried out, the display control section 140 controls the display section 112 in such a way that the display section 112 displays the direction indicated by the corrected first direction information, that is, the direction display indicating the target position.

The connection processing section 150 evaluates whether the password required for the direct connection has been entered into the terminal apparatus 100 (step S150). Specifically, the connection processing section 150 evaluates whether the password has been entered, for example, by the user's operation of the operation section 114. When no password has been entered (NO in S150), the connection processing section 150 repeats the process in S150.

On the other hand, when the password has been entered (YES in S150), the connection processing section 150 carries out the process of connecting the terminal apparatus 100 to the electronic instrument 200 via the direct connection (step S152). In this case, the connection processing section 150 carries out the process of connecting the terminal apparatus 100 directly to the electronic instrument 200 via no access point 10 as described above. In this process, the connection processing section 150 may control the first wireless communication section 106 in such a way that the terminal apparatus 100 is connected to the electronic instrument 200 by using the first wireless communication scheme.

The print control section 160 evaluates whether the print instruction has been issued (step S160). Specifically, the print control section 160 evaluates whether the print instruction has been accepted, for example, through the user's operation of the operation section 114. When no print instruction has been issued (NO in S160), the print control section 160 repeats the process in S160. On the other hand, when the print instruction has been issued (YES in S160), the print control section 160 transmits the print data contained in the print instruction to the electronic instrument 200 connected to the terminal apparatus 100 (step S162). The print control section 160 may control the first wireless communication section 106 to transmit the print data to the electronic instrument 200 by using the first wireless communication scheme. The electronic instrument 200, which is a printer, thus performs the printing to form an image corresponding to the print data on the print medium. The print media on which the image corresponding to the print data has been formed is discharged to the paper discharge tray 234, as described above.

The display control section 140 controls the display of the direction toward the selected electronic instrument 200 (step S170). The process in S170 may be substantially the same as the process in S120 described above. The message displayed on the display section 112 in the process in S170 may, however, differ from that in the process in S120. That is, in the process in S170, the display section 112 may display a message indicating that the terminal apparatus 100 has transmitted the print data to the selected electronic instrument 200. The processes in S110 to S116 may be carried out before the process in S170, as described above. The display control section 140 therefore controls the display section 112 in such a way that the display section 112 displays the direction display indicating the direction indicated by the first direction information. When the process in S116 is carried out, the display control section 140 controls the display section 112 in such a way that the display section 112 displays the direction indicated by the corrected first direction information, that is, the direction display indicating the target position.

The target position the direction toward which is indicated in the process in S170 may differ from that in the process in S120. That is, in the process in S170, the region of the user's interest is the paper discharge tray 234. It is therefore preferable for the user that the display section 112 of the terminal apparatus 100 shows the direction toward the paper discharge tray 234 with respect to the terminal apparatus 100.

Therefore, when the terminal apparatus 100 transmits the print data to the electronic instrument 200, the target position may be changed to the position corresponding to the paper discharge tray 234 of the electronic instrument 200. The correction section 138 may then carry out the correction process (S116) in such a way that the first direction information indicates the direction toward the target position corresponding to the paper discharge tray 234 with respect to the terminal apparatus 100. The display control section 140 may then cause the display section 112 to display the direction toward the target position corresponding to the paper discharge tray 234 with respect to the terminal apparatus 100.

The error evaluation section 170 evaluates whether an error has occurred in the electronic instrument 200 (step S172). Specifically, the error evaluation section 170 may evaluate whether error information indicating that an error has occurred has been acquired. The error evaluation section 170 may determine that an error has occurred when the terminal apparatus 100 receives the error information indicating that an error has occurred from the electronic instrument 200. Instead, the error evaluation section 170 may determine that an error has occurred when the terminal apparatus 100 is disconnected from the electronic instrument 200. Still instead, the error evaluation section 170 may determine that an error has occurred when the electronic instrument 200 that should be present is not found in the processes in S102 and S104.

The error corresponds, for example, to abnormality having occurred in the connection between the electronic instrument 200 and the terminal apparatus 100, failure having occurred in the action of the electronic instrument 200, or a paper jam or other problems during printing. The error information described above may be contained, for example, in the BLE beacon Bb transmitted from the electronic instrument 200. The error information may indicate, for example, the type of the error and a position relating to the error having occurred in the electronic instrument 200. The "position relating to the error" corresponds to the position where the cause of the error is displayed, or the position of a switch or any other component relating to operation that eliminates the error. The "position relating to the error" is, for example, the position of an error relating LED (light emitting diode), or the position of an error relating button.

When no error has occurred in the electronic instrument 200 (NO in S172), the process in S172 is repeated. On the other hand, when an error has occurred in the electronic instrument 200 (YES in S172), the display control section 140 controls the display of the direction toward the electronic instrument 200 in which the error has occurred (step S180). The process in S180 may be substantially the same as the process in S120 described above. The message displayed on the display section 112 in the process in S180 may, however, differ from that in the process in S120. That is, in the process in S180, the display section 112 may display a message indicating that an error has occurred in the electronic instrument 200. The processes in S110 to S116 may be carried out before the process in S180, as described above. The display control section 140 therefore controls the display section 112 in such a way that the display section 112 displays the direction display indicating the direction indicated by the first direction information. When the process in S116 is carried out, the display control section 140 controls the display section 112 in such a way that the display section 112 displays the corrected first direction information, that is, the direction display indicating the direction indicated by the target position.

The target position the direction toward which is indicated in the process in S180 may differ from that in the process in S120. That is, in the process in S180, the region of the user's interest is the error relating position. It is therefore preferable for the user that the display section 112 of the terminal apparatus 100 shows the direction toward the error relating position.

Therefore, when an error occurs in the electronic instrument 200, the target position may be changed to a position relating to the error having occurred in the electronic instrument 200. The correction section 138 may then carry out the correction process (S116) in such a way that the first direction information indicates the direction toward the target position relating to the error. The display control section 140 may then cause the display section 112 to display the direction toward the target position relating to the error.

FIG. 6 shows a first example of the correction process in S116 in the flowchart shown in FIG. 5. FIG. 7 shows a second example of the correction process in S116 in the flowchart shown in FIG. 5. The first example shown in FIG. 6 will first be described.

The correction section 138 identifies the model of the electronic instrument 200 (step S12). Specifically, the correction section 138 may identify the model of the electronic instrument 200 by using model information contained in the BLE beacon Bb received from the electronic instrument 200. Instead, in the case of the electronic instrument 200 that establishes the infrastructure connection, the correction section 138 may identify the model of the electronic instrument 200 by using model information contained in the response packet received from the electronic instrument 200.

The correction section 138 identifies a model table corresponding to the identified model (step S14). Specifically, the storage section 104 of the terminal apparatus 100 stores in advance model tables corresponding to a variety of models of the electronic instrument 200. The correction section 138 identifies a model table corresponding to the model identified in the process in S12. The model tables will be described later.

The correction section 138 acquires an angle $\beta$ corresponding to the direction toward the terminal apparatus 100 with respect to the electronic instrument 200 (step S16). Specifically, the correction section 138 handles the BLE beacon Bb transmitted from the electronic instrument 200, that is, detects an angle of transmission, that is, an angle of departure (AoD) of the radio wave in the electronic instrument 200. The angle of departure AoD can be calculated in accordance with the AoD scheme described in JP-A-2021-29012. That is, the electronic instrument 200 includes a plurality of antennas. The electronic instrument 200 radiates radio waves, that is, the BLE beacons Bb via the plurality of antennas. The correction section 138 of the terminal apparatus 100 calculates the angle of departure AoD, which is an angle with respect to the direction in which the plurality of antennas are arranged, based on the distance between the plurality of antennas and the difference in phase between the radio waves transmitted via the plurality of antennas. It is assumed that the terminal apparatus 100 is notified in advance of information representing the distance between the plurality of antennas of the electronic instrument 200 and information representing the timing of transmission of the radio waves via the plurality of antennas. The two types of information may be contained in the BLE beacon Bb. The correction section 138 thus acquires second direction information.

Instead, the terminal apparatus 100 may radiate a radio wave such as a BLE beacon. The electronic instrument 200 may then detect the angle of reception, that is, the angle of arrival AoA, at which the radio wave is received by the electronic instrument 200, or the angle of the BLE beacon or any other radio wave transmitted from the terminal apparatus 100. The angle of arrival AoA can be calculated by the method described in JP-A-2021-29012. That is, the electronic instrument 200 includes a plurality of antennas. The electronic instrument 200 receives the radio waves with the plurality of antennas. The electronic instrument 200 calculates the angle of arrival AoA, which is an angle with respect to the direction in which the plurality of antennas are arranged, based on the distance between the plurality of antennas and the difference in phase between the radio waves received by the plurality of antennas. The electronic instrument 200 then transmits the second direction information representing the angle of arrival AoA to the terminal apparatus 100. The correction section 138 thus acquires the second direction information.

The angle β corresponds to the angle of the direction toward the terminal apparatus 100 with respect to the direction in which the wireless substrate including the plurality of antennas described above and the target position are arranged. The correction section 138 therefore calculates the angle β from the angle of the direction in which the wireless substrate and the target position are arranged with respect to the direction in which the plurality of antennas are arranged and the second direction information (angle of departure AoD or angle of arrival AoA).

Figure 8:
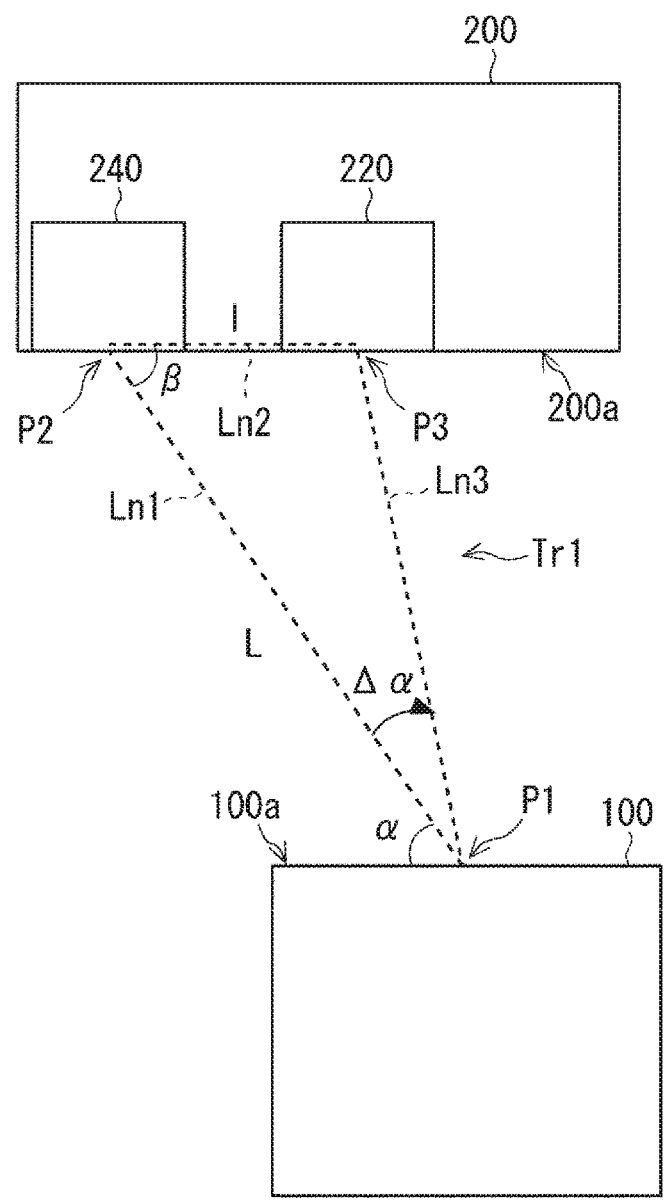
FIG. 8 is a diagram for describing the positional relationship between the electronic instrument and the terminal apparatus according to the first embodiment.

FIG. 8 is a diagram for describing the positional relationship between an electronic instrument 200 and the terminal apparatus 100 according to the first embodiment. FIG. 8 shows the terminal apparatus 100 and the electronic instrument 200. The view of the electronic instrument 200 shown in FIG. 8 is a diagrammatic top view of the electronic instrument 200. The electronic instrument 200 includes the operation panel 220 corresponding to the target position. In the example shown in FIG. 8, the electronic instrument 200 is provided with a wireless substrate 240 on the left side of the operation panel 220 when viewed from the side facing a front surface 200a of the electronic instrument 200. The position of the wireless substrate 240 in the electronic instrument 200 may vary depending on the model of each of the electronic instruments 200. The positional relationship between the wireless substrate 240 and the operation panel 220 may therefore also vary depending on the model of each of the electronic instruments 200.

The wireless substrate 240 is provided with antennas via which radio waves such as BLE beacons and Wi-Fi beacons are transmitted and received. The distance information produced in the process in S110 can therefore indicate the distance between the terminal apparatus 100 and the wireless substrate 240 of the electronic instrument 200. The first direction information produced in the process in S112 can indicate the direction toward the wireless substrate 240 of the electronic instrument 200 with respect to the terminal apparatus 100. It is now assumed that the wireless substrate 240 and the terminal apparatus 100 are connected to each other with a line Ln1, as shown in FIG. 8. Note that the line Ln1 is assumed to connect a reference point P1 on the terminal apparatus 100 to a reference point P2 on the wireless substrate 240. For the sake of description, it is further assumed that the plurality of antennas of the terminal apparatus 100 are arranged in parallel to a front surface 100a of the terminal apparatus 100. Under the assumptions described above, an angle α of the line Ln1 with respect to the surface 100a corresponds to the direction toward the wireless substrate 240 of the electronic instrument 200 with respect to the terminal apparatus 100, that is, the first direction information. A length L of the line Ln1 corresponds to the distance between the terminal apparatus 100 and the electronic instrument 200 (wireless substrate 240). Note that the plurality of antennas of the terminal apparatus 100 are not necessarily arranged in parallel to the surface 100a.

It is further assumed that the wireless substrate 240 and the operation panel 220 are connected to each other via a line Ln2. Note that the line Ln2 is assumed to connect the reference point P2 on the wireless substrate 240 to a reference point P3 on the operation panel 220. Let I be the distance between the wireless substrate 240 and the operation panel 220. Under the definitions described above, I corresponds to the length of the line Ln2. The direction indicated by the line Ln2 corresponds to the direction in which the wireless substrate 240 and the operation panel 220 are arranged. The angle β described above corresponds to the angle of the line Ln1 with respect to the line Ln2 at the reference point P2. In other words, the angle β corresponds to the angle formed by the line Ln2 and the line Ln1.

It is further assumed that the operation panel 220 and the terminal apparatus 100 are connected to each other via a line Ln3. Note that the line Ln3 is assumed to connect the reference point P3 on the operation panel 220 to the reference point P1 on the terminal apparatus 100. Under the definitions described above, the angle of the line Ln3 with respect to the line Ln1 at the reference point P1 corresponds to an amount of correction Δα of the angle α indicated by the first direction information. In other words, the amount of correction Δα corresponds to the angle formed by the line Ln1 and the line Ln3. Consider now a triangle Tr1 formed by the lines Ln1, Ln2, and Ln3, which connect the reference points P1, P2, and P3 to each other. The length of the line Ln2 corresponds to the distance I between the wireless substrate 240 and the operation panel 220, and the distance I is specified in accordance with the model of the electronic instrument 200, as described above. The angle β at the reference point P2 and the distance L corresponding to the length of the line Ln1 are acquired by the processes described above. The triangle Tr1 can therefore be uniquely specified. The amount of correction Δα can therefore also be uniquely specified.

The correction section 138 acquires the amount of correction Δα corresponding to the distance L and the angle β by referring to the model tables (step S18). Note that the model tables are information that associates the distance L to the electronic instrument 200, the angle β corresponding to the direction toward the terminal apparatus 100 with respect to the electronic instrument 200, and the amount of correction Δα of the angle α indicated by the first direction information with one another. The correction section 138 therefore carries out the process of correcting the first direction information based on the model tables.

Figures 9, 10:
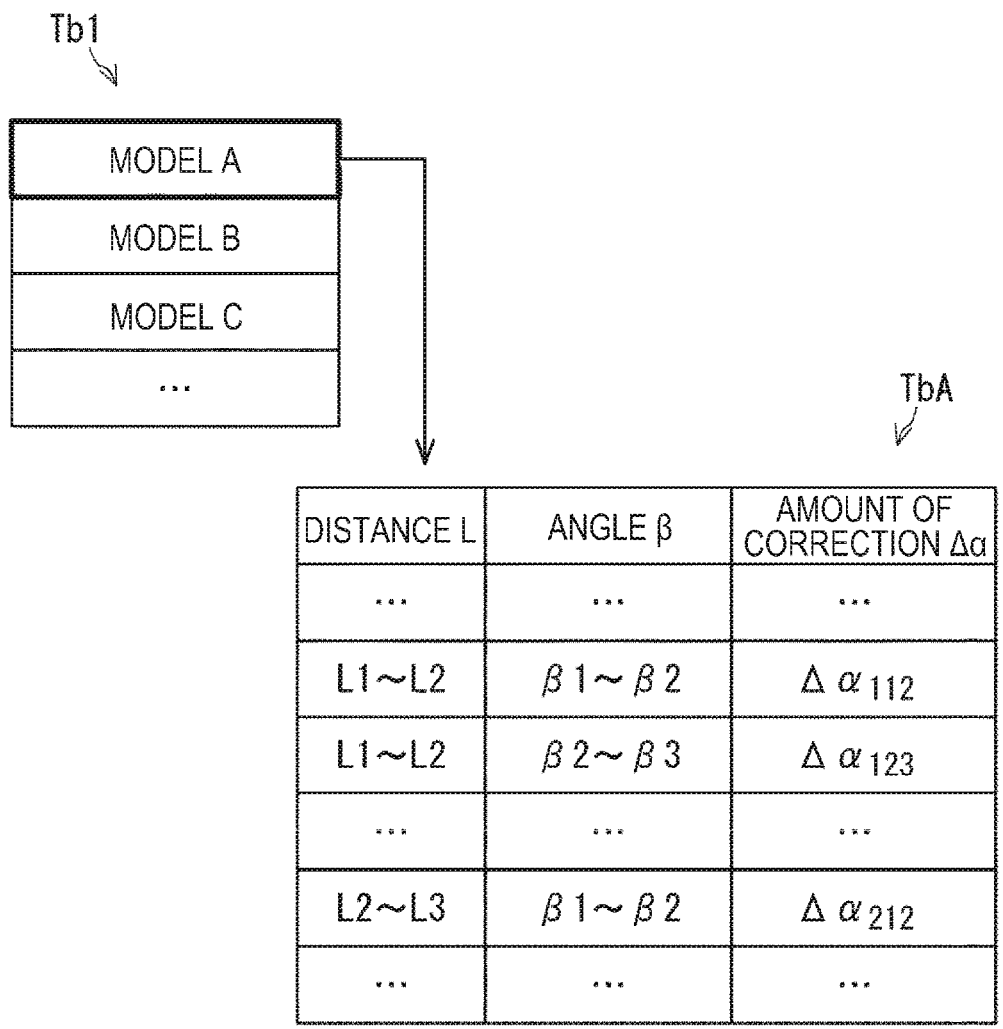
FIG. 9 shows an example of model tables used in a first example of a correction process according to the first embodiment.
FIG. 10 shows an example of the model table used in a second example of the correction process according to the first embodiment.

FIG. 9 shows an example of the model tables used in the first example of the correction process according to the first embodiment. The terminal apparatus 100 stores in advance a model table group Tb1 corresponding to a variety of models of the electronic instrument 200. The model table group Tb1 includes a model table corresponding to a model A, a model table corresponding to a model B, and a model table corresponding to a model C.

It is then assumed, for example, that the model of electronic instrument 200 is identified as the "model A" in the process in S12. In this case, in the process in S14, the correction section 138 identifies a model table TbA relating to the model A. In the model table TbA, the correction section 138 then acquires the amount of correction Δα corresponding to the distance L and the angle β acquired in the processes described above.

In the model table TbA shown in FIG. 9 by way of example, the range of the distance L, the range of the angle β and the amount of correction Δα are associated with one another. For example, when the distance L ranges from L1 to L2 (greater than or equal to L1 but smaller than L2), and the angle β ranges from β1 to β2 (greater than or equal to β1 but smaller than β2), the correction section 138 uses the model table TbA to set the amount of correction Δα at $\Delta\alpha_{112}$. When the distance L ranges from L1 to L2, and the angle β ranges from β2 to β3 (greater than or equal to β2 but smaller than β3), the correction section 138 uses the model table TbA to set the amount of correction Δα at $\Delta\alpha_{123}$. When the distance L ranges from L2 to L3 (greater than or equal to L2 but smaller than L3), and the angle β ranges from β1 to β2, the correction section 138 uses the model table TbA to set the amount of correction Δα at $\Delta\alpha_{212}$.

The correction section 138 corrects the angle α of the electronic instrument 200 with respect to the terminal apparatus 100 by using the acquired amount of correction Δα (step S20). The direction corresponding to the corrected angle α thus faces the target position. In the example shown in FIG. 8, let α' be the corrected angle α, and correction is made as follows: α'=α+Δα, so that the direction corresponding to the corrected angle α', that is, the direction of the line Ln3 points to the operation panel 220, which is the target position. The corrected first direction information can therefore indicate the direction toward the target position with respect to the terminal apparatus 100. That is, the correction section 138 carries out the process of correcting the first direction information in such a way that the first direction information indicates the direction toward the target position on the electronic instrument with respect to the terminal apparatus 100.

Note that in the model tables shown in FIG. 9 by way of example, the range of the distance L, the range of the angle β, and the amount of correction Δα are associated with one another, but not necessarily. In the model tables, each of a plurality of values of the distance L, each of a plurality of values of the angle β, and the amount of correction Δα may be associated with one another. In this case, when the distance acquired in the process in S110 or the angle β, acquired in the process in S16 does not coincide with any of the distances or angles shown in the model tables, interpolation may be performed.

Even in electronic instruments 200 of the same model but having different target position, the distance I between the wireless substrate 240 and the target position may vary. Therefore, note that different target positions require reference to different model tables. That is, for example, the model A is provided with different model tables in advance among the case where the target position is the operation panel 220, the case where the target position is the paper discharge tray 234, and the case where the target position is an error relating position. For example, before the process in S170, the correction section 138 may carry out the correction process by using the model table in the case where the distance I is the distance between the wireless substrate 240 and the paper discharge tray 234.

A second example shown in FIG. 7 will next be described. The correction section 138 identifies the model of the electronic instrument 200 (step S32), as in the process in S12. The correction section 138 acquires the distance I according to the identified model (step S34). The distance I corresponds to the distance between the wireless substrate 240 and the target position in the electronic instrument 200, as described above. The distance I corresponds to a correction parameter in the correction process.

FIG. 10 shows an example of the model table used in the second example of the correction process according to the first embodiment. The terminal apparatus 100 stores in advance a model table Tb2 corresponding to a variety of models of the electronic instrument 200. In the model table Tb2, the models are each associated with the distance I corresponding thereto. It is assumed that the model table Tb2 shown in FIG. 10 by way of example is a table in the case where the target position is the operation panel 220. The model A has a distance Ia between the wireless substrate 240 and the operation panel 220. The model B has a distance Ib between the wireless substrate 240 and the operation panel 220. The model C has a distance Ic between the wireless substrate 240 and the operation panel 220.

In electronic instruments 200 of the same model but having different target positions, the distance I between the wireless substrate 240 and the target position may vary, as in the first example. Therefore, note that different target positions require reference to different model tables. For example, before the process in S170, the correction section 138 may carry out the correction process by using the model table in the case where the distance I is the distance between the wireless substrate 240 and the paper discharge tray 234.

The correction section 138 acquires the angle β corresponding to the direction toward the terminal apparatus 100 with respect to the electronic instrument 200 (step S36), as in the process in S16. The correction section 138 calculates the amount of correction Δα by using the distance L, the distance I, and the angle β (step S38). Specifically, the correction section 138 calculates the amount of correction Δα by using the laws of sine for the triangle formed by the terminal apparatus 100, the wireless substrate 240, and the target position.

The calculation will be described with reference to FIG. 8. For the triangle Tr1 formed by the lines Ln1, Ln2, and Ln3, which connect the reference points P1, P2, and P3 with each other, shown in FIG. 8 by way of example, Expression (1) below is derived from the laws of sine.

$$I/\sin(\Delta\alpha)=L/\sin(180°-\beta-\Delta\alpha) \qquad (1)$$

The correction section 138 therefore carries out the process of correcting the first direction information by calculating Δα that satisfies Expression (1). Expression (1) depends on the distance I and the side of the operation panel 220 at which the wireless substrate 240 is located, and therefore depends on the positional relationship between the wireless substrate 240, which includes antennas, and the operation panel 220, which is the target position. That is, the correction section 138 carries out the correction process by calculating the amount $\Delta\alpha$, by which the first direction information is corrected, based on the distance L to the electronic instrument 200, the angle $\beta$, corresponding to the direction toward the terminal apparatus 100 with respect to the electronic instrument 200, and the positional relationship between the antennas and the target position.

The correction section 138 corrects the angle $\alpha$ of the electronic instrument 200 with respect to the terminal apparatus 100 by using the acquired amount of correction $\Delta\alpha$ (step S40). The direction corresponding to the corrected angle $\alpha$ thus points to the target position, as in the first example. That is, the correction section 138 carries out the process of correcting the first direction information in such a way that the first direction information indicates the direction toward the target position on the electronic instrument.

Figure 11:
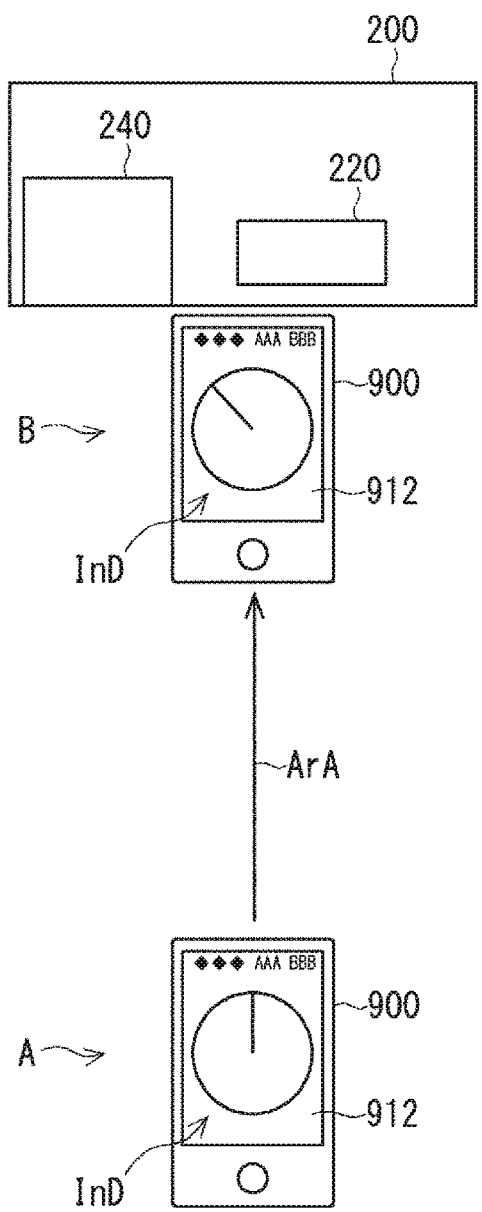
FIG. 11 shows the positional relationship between the terminal apparatus according to Comparative Example and the electronic instrument.

FIG. 11 shows the positional relationship between a terminal apparatus 900 according to Comparative Example and any of the electronic instruments 200. Comparative Example shown in FIG. 11 corresponds to the technology described in JP-A-2021-29012. When the terminal apparatus 900 is sufficiently separate from the electronic instrument 200, as indicated by the arrow A, it can be said that a direction display InD displayed on a display section 912 of the terminal apparatus 900 indicates an approximate direction toward the electronic instrument 200. When the terminal apparatus 900 is sufficiently separate from the electronic instrument 200, there is no problem as long as the display section 912 of the terminal apparatus 900 shows the direction display InD, which indicates the approximate direction toward the electronic instrument 200.

On the other hand, it is assumed that a user who carries the terminal apparatus 900 moves toward the electronic instrument 200, as indicated by the arrow ArA, so that the terminal apparatus 900 is caused to approach the electronic instrument 200 in such a way that the distance therebetween is smaller than or equal to a predetermined distance, as indicated by the arrow B. In this case, the direction display InD displayed on the display section 912 shows the direction toward the wireless substrate 240. It is believed desirable that when the terminal is caused to approach the electronic instrument 200, the direction display InD indicates the direction toward the target position to which the user pays attention, such as the operation panel 220. When the position of the wireless substrate 240 is separate from the target position such as the operation panel 220 in the electronic instrument 200, however, the direction indicated by the direction display InD can undesirably deviate from the desired direction. Comparative Example may therefore cause loss of convenience of the user.

In contrast, in the present embodiment, the correction section 138 is configured to carry out the process of correcting the first direction information in such a way that the first direction information indicates the direction toward the target position on the electronic instrument 200 with respect to the terminal apparatus 100 based on the distance information. The display control section 140 is configured to cause the display section 112 to display the direction toward the target position with respect to the terminal apparatus 100 based on the corrected first direction information. The configurations described above can suppress display of the direction display that deviates from the direction toward the desired position on the electronic instrument 200 (position of operation panel 220 of electronic instrument 200, for example). The convenience of the user is therefore improved.

In the present embodiment, the correction section 138 may be configured to carry out the correction process when the distance to the electronic instrument 200 is smaller than the threshold specified in advance. The configuration described above prevents the correction process from being carried out even when it is sufficient to display an approximate direction toward the electronic instrument 200, for example, when the terminal apparatus 100 is sufficiently separate from the electronic instrument 200. An increase in processing load is therefore suppressed.

In the present embodiment, the correction section 138 may be configured to carry out the correction process based on information that associates the distance to the electronic instrument 200, the angle corresponding to the direction toward the terminal apparatus 100 with respect to the electronic instrument 200, and the amount by which the first direction information is corrected with one another. The correction section 138 may instead be configured to calculate the amount by which the first direction information is corrected based on the distance to the electronic instrument 200, the angle corresponding to the direction toward the terminal apparatus 100 with respect to the electronic instrument 200, and the positional relationship between the antennas used for the short-range wireless communication and the target position. The former configuration allows the correction process to be carried out in the form of a simplified process as compared with the latter configuration. On the other hand, the latter configuration allows the correction process to be carried out more accurately than the former configuration. The latter configuration also eliminates the need for the association information (table) required for the former configuration. That is, it is not necessary to prepare in advance complicated information that associates the distance to the electronic instrument 200, the angle corresponding to the direction toward the terminal apparatus 100 with respect to the electronic instrument 200, and the amount by which the first direction information is corrected with one another.

In the present embodiment, the target position may be a position corresponding to the operation panel 220 of the electronic instrument 200. The configuration described above allows the display section 112 to display the direction toward a target to which the user is most likely to pay attention, which is the operation panel 220. The convenience of the user is therefore improved.

The target position may be changed in accordance with conditions. The target position is thus also changed when the position to which the user is most likely to pay attention changes in accordance with the conditions. The convenience of the user is therefore improved.

In the present embodiment, when an error relating to the electronic instrument 200 occurs, the correction section 138 may be configured to carry out the process of correcting the first direction information in such a way that the first direction information indicates the direction toward the target position relating to the error. In this case, the display control section 140 may be configured to cause the display section 112 to display the direction toward the target position relating to the error. The configuration described above allows the user to readily grasp the position relating to an error having occurred in the electronic instrument 200. The convenience of the user is therefore improved.

In the present embodiment, the correction section 138 may be configured to carry out the correction process in such a way that the first direction information indicates the direction toward the target position corresponding to the paper discharge tray 234 when the terminal apparatus 100 transmits print data to the electronic instrument 200 having a printing function. In this case, the display control section 140 may be configured to cause the display section 112 to display the direction toward the target position corresponding to the paper discharge tray 234. The configuration described above allows the user to readily grasp the position of the paper discharge tray 234. The convenience of the user is therefore improved.

Figure 12:
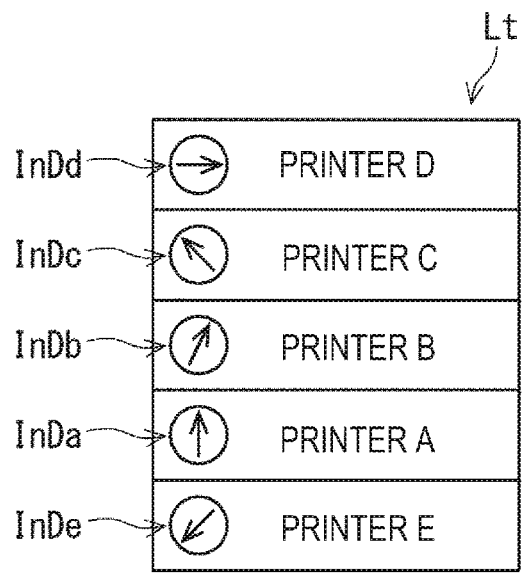
FIG. 12 shows an example of a screen displayed on the terminal apparatus according to the first embodiment.

FIGS. 12 to 17 show examples of a screen displayed on the terminal apparatus 100 according to the first embodiment. FIGS. 12 to 15 show examples of the screen displayed in the case where the target position is the position corresponding to the operation panel 220. FIG. 12 shows an example of the device list displayed on the terminal apparatus 100 according to the first embodiment. FIG. 12 shows a device list Lt in a case where the printers A to E (electronic instruments 200A to 200E) have been found. FIG. 12 shows an example in which the device list Lt shows the direction display relating to each of the printers.

The device list Lt shown by way of example in FIG. 12 shows the printers (electronic instruments 200) in ascending order of distance from the terminal apparatus 100. In the example shown in FIG. 12, the distances from the terminal apparatus 100 to the printers increases in the following order: the printer D; the printer C; the printer B; the printer A; and the printer E. The order in which the printers are displayed in the device list Lt is not necessarily the ascending order of distance from the terminal apparatus 100. The same holds true for the device list Lt in other figures.

The device list Lt shown by way of example in FIG. 12 further includes the direction displays InD, which indicate the directions toward the printers with respect to the terminal apparatus 100. The direction display InD shows, for each of the printers, the direction indicated by the first direction information in the form of the orientation of an arrow. When the distance between the terminal apparatus 100 and each of the printers is smaller than the threshold, the direction display InD relating to the printer indicates the direction in which the correction process has been carried out, that is, the direction toward the operation panel 220.

In the device list Lt shown by way of example in FIG. 12, the direction toward the printer D is indicated by a direction display InDd, which indicates the direction toward the printer D with respect to the terminal apparatus 100. The direction display InDd indicates that the direction toward the printer D is the right direction with respect to the terminal apparatus 100. In the device list Lt, the direction toward the printer C is indicated by a direction display InDc, which indicates the direction toward the printer C with respect to the terminal apparatus 100. The direction display InDc indicates that the direction toward the printer C is an obliquely forward left direction with respect to the terminal apparatus 100.

In the device list Lt, the direction toward the printer B is indicated by a direction display InDb, which indicates the direction toward the printer B with respect to the terminal apparatus 100. The direction display InDb indicates that the direction toward the printer B is an obliquely forward right direction with respect to the terminal apparatus 100. In the device list Lt, the direction toward the printer A is indicated by a direction display InDa, which indicates the direction toward the printer A with respect to the terminal apparatus 100. The direction display InDa indicates that the direction toward the printer A is the forward direction with respect to the terminal apparatus 100. In the device list Lt, the direction toward the printer E is indicated by a direction display InDe, which indicates the direction toward the printer E with respect to the terminal apparatus 100. The direction display InDe indicates that the direction toward the printer E is an obliquely rearward left direction with respect to the terminal apparatus 100.

Figure 13:
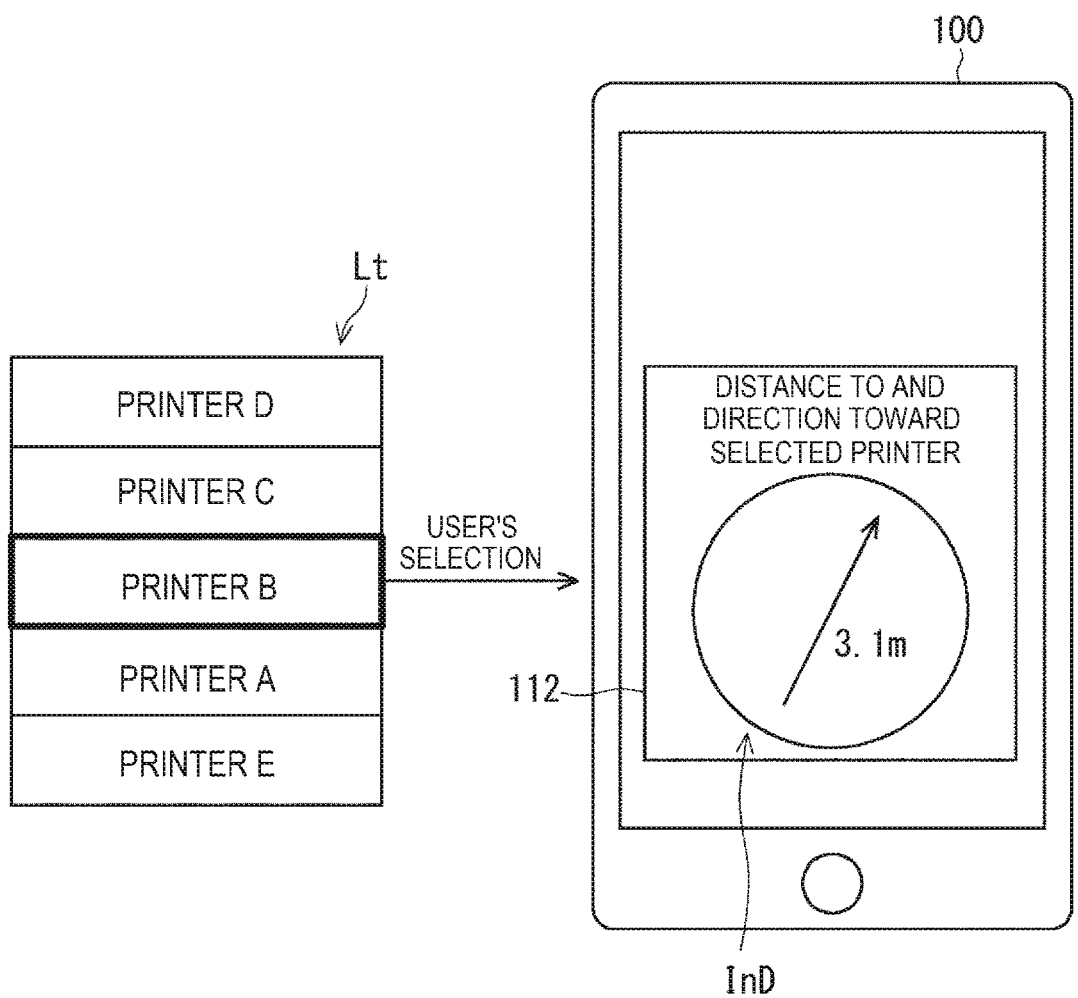
FIG. 13 shows an example of the screen displayed on the terminal apparatus according to the first embodiment.

FIG. 13 shows an example of the selection of a printer by using the device list Lt displayed on the terminal apparatus 100 according to the first embodiment. FIG. 13 shows a device list in the case where the printers A to E (electronic instruments 200A to 200E) have been found. The device list shown by way of example in FIG. 13 shows the printers (electronic instruments 200) in ascending order of distance from the terminal apparatus 100. On the other hand, the device list shown by way of example in FIG. 13 differs from the device list shown by way of example in FIG. 12 in that the device list shows no direction display. In the example shown in FIG. 13, the distances from the terminal apparatus 100 to the printers increases in the following order: the printer D; the printer C; the printer B; the printer A; and the printer E.

In the example shown in FIG. 13, the user selects the printer B by using the device list displayed on the terminal apparatus 100. In this case, when the user selects the printer B, the display section 112 of the terminal apparatus 100 shows the direction display InD, which indicates the direction toward the printer B with respect to the terminal apparatus 100, as in the example shown in FIG. 13. The display section 112 may further display a distance of "3.1 meters" between the terminal apparatus 100 and the printer B, as in the example shown in FIG. 13. The display section 112 may still further display a message of "Distance to and direction toward selected printer", as in the example shown in FIG. 13. When the distance between the terminal apparatus 100 and the printer B is smaller than the threshold, the direction display InD indicates the direction toward the operation panel 220 of the electronic instrument 200 as a result of the correction process carried out by the correction section 138.

Figure 14:
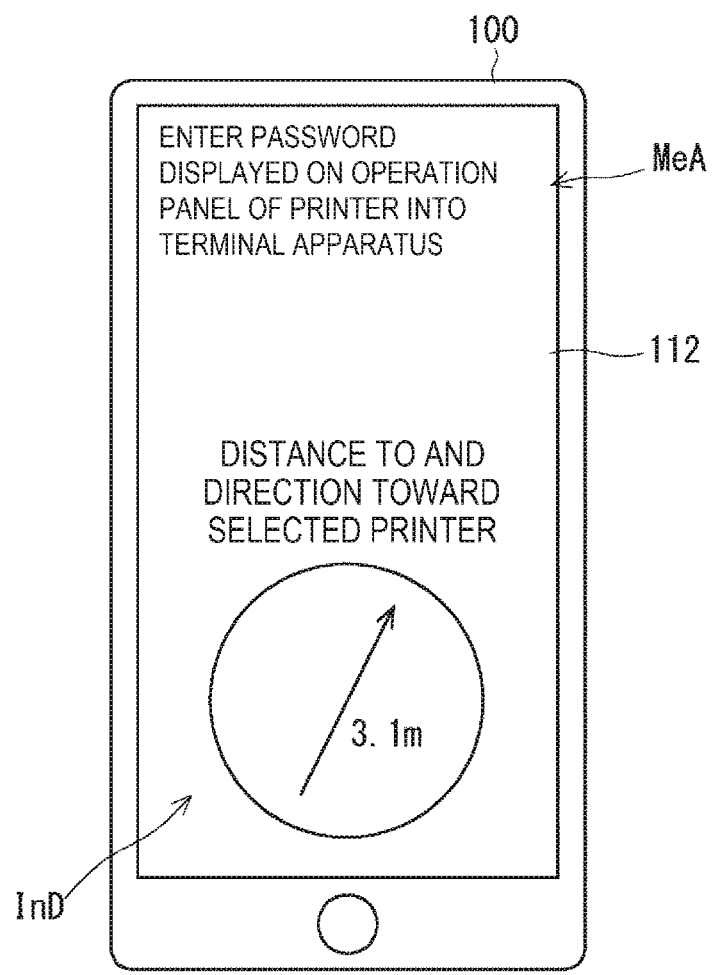
FIG. 14 shows an example of the screen displayed on the terminal apparatus according to the first embodiment.

FIG. 14 shows an example of the screen displayed on the display section 112 of the terminal apparatus 100 when the terminal apparatus 100 according to the first embodiment establishes the direct connection to the electronic instrument 200, which is a printer. FIG. 14 shows an example of the screen displayed on the display section 112 in the process in S140 of the flowchart shown in FIG. 5.

The display section 112 of the terminal apparatus 100 displays the direction display InD, which indicates the direction toward the selected printer, as shown by way of example in FIG. 14. When the distance between the terminal apparatus 100 and the printer is smaller than the threshold, the direction display InD indicates the direction toward the operation panel 220 of the electronic instrument 200 with respect to the terminal apparatus 100 as a result of the correction process carried out by the correction section 138.

The display section 112 may further display the distance of "3.1 meters" between the terminal apparatus 100 and the printer, as in the example shown in FIG. 14. The display section 112 may still further display the message of "Distance to and direction toward selected printer", as in the example shown in FIG. 14. Furthermore, the display section 112 may display a message MeA of "Enter password displayed on operation panel of printer into terminal apparatus", as in the example shown in FIG. 14. The message MeA is a message that prompts the user to enter the password displayed on the operation panel 220 of the printer (electronic instrument 200) into the terminal apparatus 100.

Figure 15:
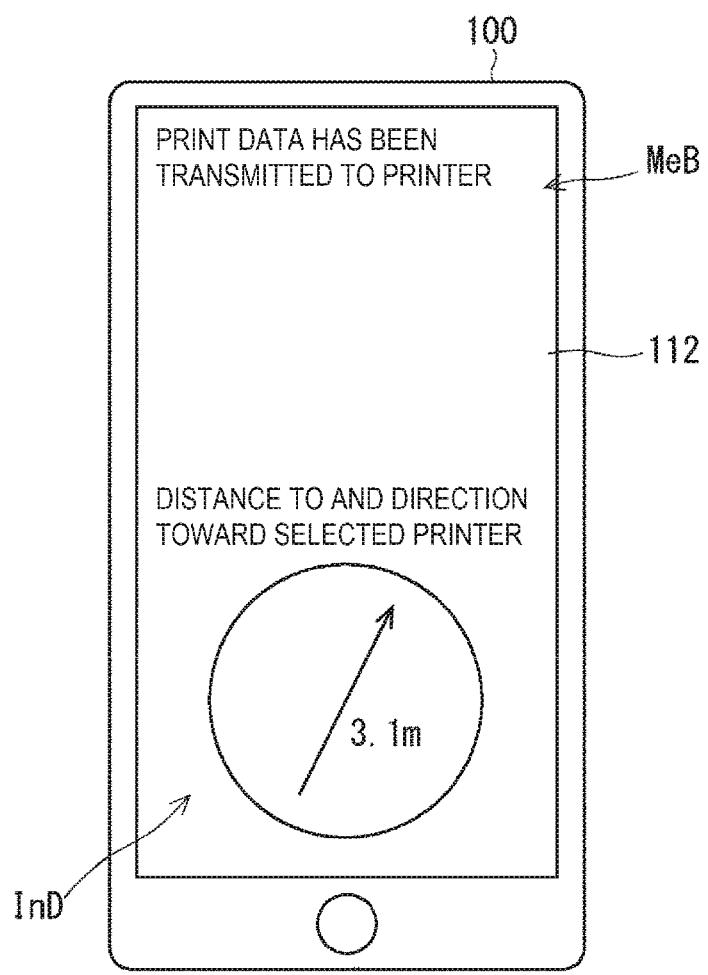
FIG. 15 shows an example of the screen displayed on the terminal apparatus according to the first embodiment.

FIG. 15 shows an example of the screen displayed on the display section 112 of the terminal apparatus 100 when the terminal apparatus 100 according to the first embodiment transmits print data to the electronic instrument 200, which is a printer. FIG. 15 shows an example of the screen displayed on the display section 112 in the process in S170 of the flowchart shown in FIG. 5.

The display section 112 of the terminal apparatus 100 displays the direction display InD, which indicates the direction toward the selected printer with respect to the terminal apparatus 100, as shown by way of example in FIG. 15. When the distance between the terminal apparatus 100 and the printer is smaller than the threshold, the direction display InD indicates the direction toward the operation panel 220 of the electronic instrument 200 with respect to the terminal apparatus 100 as a result of the correction process carried out by the correction section 138.

The display section 112 may further display the distance of "3.1 meters" between the terminal apparatus 100 and the printer, as shown by way of example in FIG. 15. The display section 112 may still further display the message of "Distance to and direction toward selected printer", as shown by way of example in FIG. 15. Furthermore, the display section 112 may display a message MeB of "Print data has been transmitted to printer", as shown by way of example in FIG. 15. The message MeB is a message that indicates that the print data has been transmitted to the selected printer (electronic instrument 200).

Figure 16:
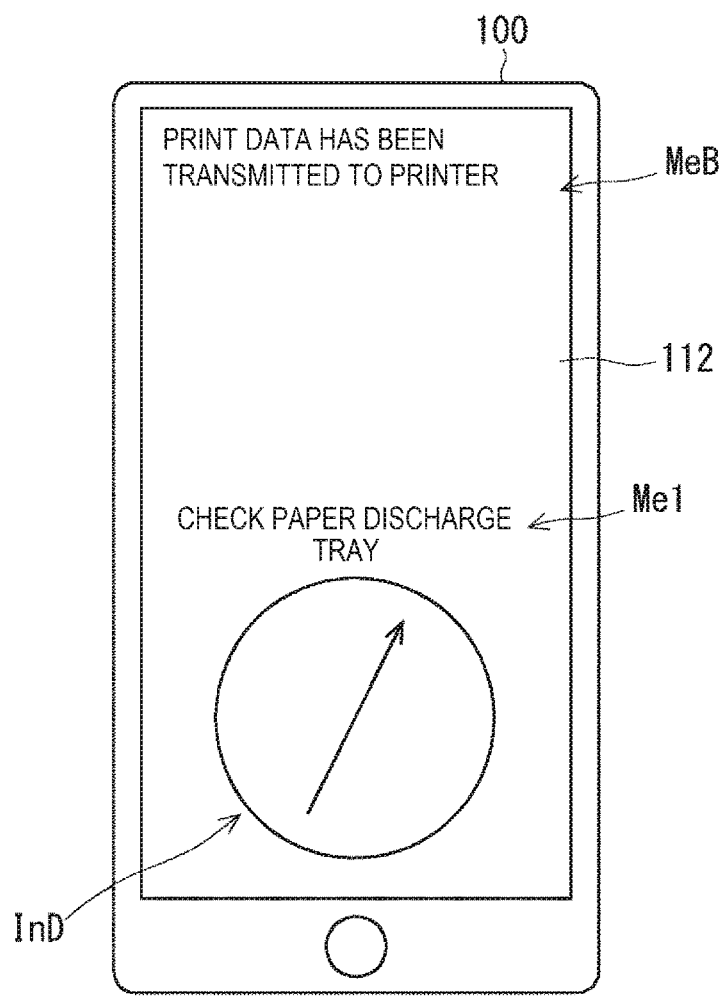
FIG. 16 shows an example of the screen displayed on the terminal apparatus according to the first embodiment.

FIG. 16 shows an example of the screen displayed on the display section 112 of the terminal apparatus 100 when the terminal apparatus 100 according to the first embodiment transmits print data to the electronic instrument 200, which is a printer. FIG. 16 shows an example of the screen displayed on the display section 112 in the process in S170 of the flowchart shown in FIG. 5. FIG. 16 shows by way of example a case where the target position is the position corresponding to the paper discharge tray 234. It is then assumed in the example shown in FIG. 16 that the distance between the terminal apparatus 100 and the printer is small than the threshold. In this case, the direction display InD indicates the direction toward the paper discharge tray 234 of the electronic instrument 200 with respect to the terminal apparatus 100 as a result of the correction process carried out by the correction section 138. The configuration described above allows the user to readily grasp the position of the paper discharge tray 234. The convenience of the user is therefore improved.

When the direction display InD indicates the direction toward the paper discharge tray 234 with respect to the terminal apparatus 100, the display section 112 may display a message Me1 of "Check the paper discharge tray", as shown by way of example in FIG. 16. The display section 112 may display the message MeB shown by way of example in FIG. 15, as shown by way of example in FIG. 16.

Figure 17:
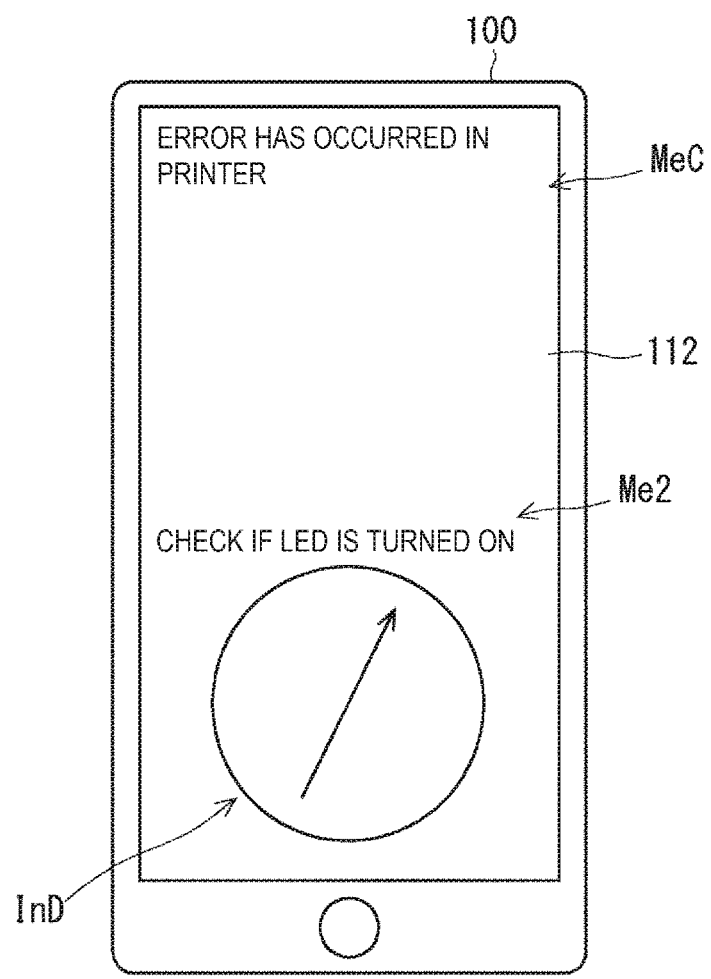
FIG. 17 shows an example of the screen displayed on the terminal apparatus according to the first embodiment.

FIG. 17 shows an example of the screen displayed on the display section 112 of the terminal apparatus 100 when an error occurs in the electronic instrument 200 according to the first embodiment. FIG. 17 shows an example of the screen displayed on the display section 112 in the process in S180 of the flowchart shown in FIG. 5. FIG. 17 shows by way of example the case where the target position is the position relating to an error. It is then assumed in the example shown in FIG. 17 that the distance between the terminal apparatus 100 and the printer is small than the threshold. In this case, the direction display InD indicates the direction toward the error relating position on the electronic instrument 200 with respect to the terminal apparatus 100 as a result of the correction process carried out by the correction section 138. In the example shown in FIG. 17, the error relating position corresponds to the position of an LED relating to the error. The configuration described above allows the user to readily grasp the position of the error relating LED. The convenience of the user is therefore improved.

When the direction display InD indicates the direction toward the error relating LED with respect to the terminal apparatus 100, the display section 112 may display a message Me2 of "Check if LED is turned on", as shown by way of example in FIG. 17. The display section 112 may further display a message MeC of "Error has occurred in printer", as shown by way of example in FIG. 17. The message MeC is a message that informs the user that an error has occurred in the printer.

Variations

The present disclosure is not limited to the embodiment described above, and may be modified as appropriate without departing from the intent of the present disclosure. For example, the communication system 1 shown in FIG. 2 includes five electronic instruments 200, but the communication system 1 includes any number of electronic instruments 200.

The order in which the processes in each of the flowcharts described above are carried out can be changed as appropriate. One or more of the processes in the flowcharts described above can be omitted. For example, in the flowchart shown in FIG. 5, the order in which the processes in S102 and S104 are carried out may be reversed. Instead, the processes in S102 and S104 may be carried out in parallel to each other. The order in which the processes in S110 and S112 are carried out may be reversed. Instead, the processes in S110 and S112 may be carried out in parallel to each other. The processes in S172 and S180 may be omitted. The processes in S160 to S170 may be omitted. The processes in S130 to S152 may be omitted.

In the example described above, the target position in the processes in S120 and S140 is the position corresponding to the operation panel 220, but the target position in this case may not be the position corresponding to the operation panel 220. For example, the target position in this case may be the center position on the electronic instrument 200.

The target position may not be changed in the processes in S170 and S180. That is, the target position may remain the same as the position corresponding to the operation panel 220 even when the print data is transmitted to the electronic instrument 200 and an error occurs in the electronic instrument 200. Changing the target position in the case described above, however, further improve the convenience of the user.

In the example described above, the programs each include a group of instructions (or software codes) that, when loaded into a computer, cause the computer to perform one or more of the functions described in the embodiment. The programs may be stored on a non-transitory computer readable medium or a tangible storage medium. The computer readable medium or the tangible storage medium is not limited to a specific medium and may include a random-access memory (RAM), a read-only memory (ROM), a flash memory, a solid-state drive (SSD), or a memory based on any other memory technology, a CD-ROM, a digital versatile disk (DVD), a Blu-ray (registered trademark) disk, or any other optical disk storage, a magnetic cassette, a magnetic tape, a magnetic disk storage, or any other magnetic storage device. The programs may be transmitted on a transitory computer readable medium or a communication medium. The transitory computer readable medium or the communication medium is not limited to a specific medium and may include an electrical, optical, or acoustic propagation signal, or a propagation signal in any other form.

What is claimed is:

1. A terminal apparatus comprising:
one or more processor; and
a memory including instructions stored thereon that, when executed by the one or more processors, cause the terminal apparatus to:
acquire first distance information representing a distance between the terminal apparatus and an electronic instrument through short-range wireless communication with the electronic instrument;
acquire first direction information representing a direction toward a wireless communication device of the electronic instrument with respect to the terminal apparatus through the short-range wireless communication with the electronic instrument;
carry out a correcting process of correcting the first direction information based on the first distance information, the first direction information, and second distance information representing a distance between the wireless communication device and a target position of the electronic instrument in such a way that the corrected first direction information indicates a direction toward the target position on the electronic instrument; and
cause a display to display the direction toward the target position based on the corrected first direction information.

2. The terminal apparatus according to claim 1, wherein the correction process is carried out when the distance to the electronic instrument is smaller than a threshold specified in advance.

3. The terminal apparatus according to claim 1, wherein the correction process is carried out based on information that associates the distance to the electronic instrument, an angle corresponding to a direction toward the terminal apparatus with respect to the wireless communication device of the electronic instrument, and an amount by which the first direction information is corrected with one another.

4. The terminal apparatus according to claim 1, wherein the correction process is carried out by calculating an amount by which the first direction information is corrected based on the distance to the electronic instrument, an angle corresponding to a direction toward the terminal apparatus with respect to the wireless communication device of the electronic instrument, and a positional relationship between an antenna used for the short-range wireless communication and the target position.

5. The terminal apparatus according to claim 1, wherein the target position is a position corresponding to an operation panel of the electronic instrument.

6. The terminal apparatus according to claim 1, wherein the target position is changed in accordance with conditions.

7. The terminal apparatus according to claim 6, wherein when an error occurs in the electronic instrument, the correction process is carried out in such a way that the first direction information indicates the direction toward the target position relating to the error, and
the display is caused to display the direction toward the target position relating to the error.

8. The terminal apparatus according to claim 6, wherein when the terminal apparatus transmits print data to the electronic instrument having a printing function, the correction process is carried out in such a way that the first direction information indicates the direction toward the target position corresponding to a paper discharge tray of the electronic instrument, and
the display is caused to display the direction toward the target position corresponding to the paper discharge tray.

9. A display control method comprising:
acquiring first distance information representing a distance between a terminal apparatus and an electronic instrument through short-range wireless communication with the electronic instrument;
acquiring first direction information representing a direction toward the electronic instrument with respect to a wireless communication device of the terminal apparatus through the short-range wireless communication with the electronic instrument;
carrying out a correcting process of correcting the first direction information based on the first distance information, the first direction information, and second distance information representing a distance between the wireless communication device and a target position of the electronic instrument in such a way that the corrected first direction information indicates a direction toward the target position on the electronic instrument; and
causing a display to display the direction toward the target position based on the corrected first direction information.

10. A program that causes a computer to
acquire first distance information representing a distance between a terminal apparatus and an electronic instrument through short-range wireless communication with the electronic instrument;
acquire first direction information representing a direction toward a wireless communication device of the electronic instrument with respect to the terminal apparatus through the short-range wireless communication with the electronic instrument;
carry out a correcting process of correcting the first direction information based on the first distance information, the first direction information, and second distance information representing a distance between the wireless communication device and a target position of the electronic instrument in such a way that the corrected first direction information indicates a direction toward the target position on the electronic instrument; and
cause a display to display the direction toward the target position based on the corrected first direction information.

* * * * *